United States Patent
Sloan et al.

(10) Patent No.: US 10,195,937 B2
(45) Date of Patent: Feb. 5, 2019

(54) MODULAR FUEL STORAGE SYSTEM

(71) Applicant: Agility Fuel Systems LLC, Santa Ana, CA (US)

(72) Inventors: Todd Sloan, Kelowna (CA); Chris Forsberg, Kelowna (CA); Jason Laycock, Kelowna (CA); David Cate, Nashville, TN (US); Yoshio Coy, San Clemente, CA (US); Amir Mahani, Kelowna (CA)

(73) Assignee: Agility Fuel Systems LLC, Costa Mesa, CA (US)

( * ) Notice: Subject to any disclaimer, the term of this patent is extended or adjusted under 35 U.S.C. 154(b) by 0 days.

(21) Appl. No.: 15/230,311

(22) Filed: Aug. 5, 2016

(65) Prior Publication Data

US 2017/0129330 A1    May 11, 2017

Related U.S. Application Data

(60) Provisional application No. 62/203,215, filed on Aug. 10, 2015.

(51) Int. Cl.
  B60P 7/08 (2006.01)
  B60K 15/067 (2006.01)
  (Continued)

(52) U.S. Cl.
  CPC .......... B60K 15/067 (2013.01); *A47B 47/028* (2013.01); *A47B 81/007* (2013.01);
  (Continued)

(58) Field of Classification Search
  CPC .......... B60K 15/067; B60K 2015/0638; B60K 2015/0639; B60K 2015/0636; A47B 81/007; A47B 47/028
  (Continued)

(56) References Cited

U.S. PATENT DOCUMENTS 3,294,225 A  * 12/1966 Kenyon ................. B65D 71/02
                                                            138/157
4,357,027 A    11/1982 Zeitlow
            (Continued)

FOREIGN PATENT DOCUMENTS

JP        H09315433 A    12/1997
JP        2008254819 A   10/2008
            (Continued)

OTHER PUBLICATIONS

European search report dated Oct. 12, 2016 for EP2951043.
(Continued)

*Primary Examiner* — Stephen T Gordon
(74) *Attorney, Agent, or Firm* — Knobbe Martens Olson & Bear, LLP

(57) ABSTRACT

Methods and systems for modular fuel storage and transportation are provided. In an embodiment, a fuel storage system includes one or more fuel containers each supported by a fuel container support assembly. The fuel storage system may be mounted to a transportation device such as a vehicle or used in a stand-alone fashion. Each support assembly may include a plurality of detachable end support members such as end support members configured to support the end portions of the fuel container and side support members configured to support the body portion of the fuel container. Some of the end support members may include neck grooves such that when the end support members are coupled, the neck grooves form an enclosure around the neck portion of the fuel container. In an embodiment, the support assembly is configured to facilitate release of excess pressure in the fuel container.

16 Claims, 15 Drawing Sheets

(51) Int. Cl.
*F17C 1/00* (2006.01)
*F17C 13/08* (2006.01)
*A47B 47/02* (2006.01)
*A47B 81/00* (2006.01)
*A47B 87/02* (2006.01)
*B60P 7/12* (2006.01)
*B60K 15/063* (2006.01)

(52) U.S. Cl.
CPC ............ *A47B 87/0207* (2013.01); *F17C 1/00* (2013.01); *F17C 13/08* (2013.01); *B60K 2015/0636* (2013.01); *B60K 2015/0638* (2013.01); *B60K 2015/0639* (2013.01); *B60P 7/12* (2013.01)

(58) Field of Classification Search
USPC ...... 410/33, 36, 37, 39, 40, 42, 49, 50, 155; 206/443, 446; 141/231; 137/267, 376
See application file for complete search history.

(56) References Cited

U.S. PATENT DOCUMENTS

| | | |
|---|---|---|
| 4,784,399 A | 11/1988 | Finn |
| 4,899,901 A | 2/1990 | Nickel |
| 5,149,041 A | 9/1992 | Hartke |
| 5,154,556 A | 10/1992 | Wappel |
| 6,843,237 B2 | 1/2005 | Bowen et al. |
| 7,137,474 B2 | 11/2006 | Yokote |
| 7,189,040 B2 | 3/2007 | Sharp et al. |
| 7,543,667 B2 | 6/2009 | Hwang et al. |
| 9,388,942 B2 | 7/2016 | Sloan et al. |
| 2007/0046066 A1 | 3/2007 | Cosgrove et al. |
| 2010/0078244 A1 | 4/2010 | Pursifull |
| 2012/0174371 A1 | 7/2012 | Koehnen et al. |
| 2014/0217107 A1 | 8/2014 | Sloan et al. |
| 2016/0363266 A1 | 12/2016 | Sloan et al. |

FOREIGN PATENT DOCUMENTS

| | | |
|---|---|---|
| JP | 2011126566 A | 6/2011 |
| KR | 100925937 B1 | 11/2009 |

OTHER PUBLICATIONS

European search report with opinion dated Jan. 13, 2017 for EP2951043.

International search report and written opinion dated May 14, 2014 for PCT/US2014/014297.

"International search report with written opinion dated Oct. 14, 2016 for PCT/US16/46066".

Notice of allowance dated Mar. 17, 2016 for U.S. Appl. No. 14/170,383.

Office action dated Sep. 11, 2015 for U.S. Appl. No. 14/170,383.

* cited by examiner

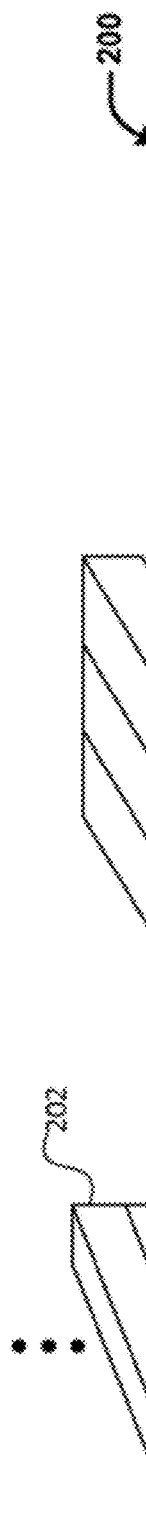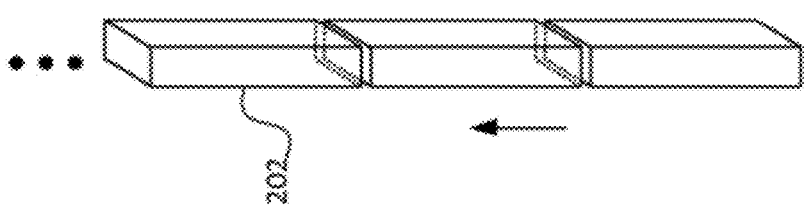

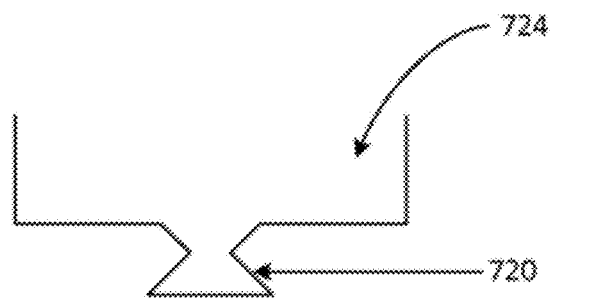
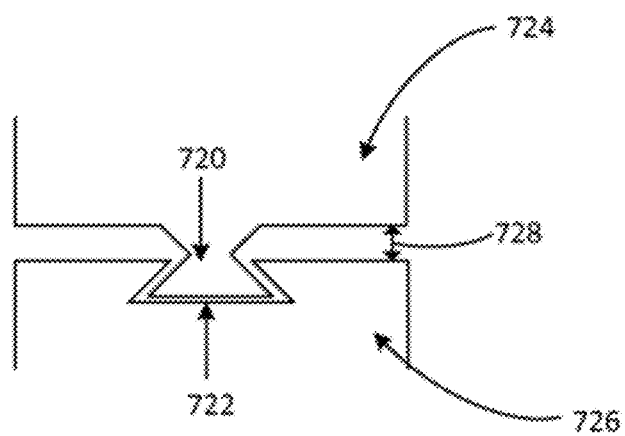
FIG. 7b

MODULAR FUEL STORAGE SYSTEM

CROSS-REFERENCE

This application claims the benefit of U.S. Provisional Application No. 62/203,215, filed Aug. 10, 2015, which application is incorporated herein by reference in its entirety.

BACKGROUND OF THE INVENTION

Fuel storage systems including fuel containers and support structures thereof are generally used to store and/or transport fuels such as natural gas. Typically, such fuel storage systems are custom built and/or hard to assemble and/or dissemble, making it difficult to change the configuration of or mix and match components of such systems. Thus, a need exists for improved systems and methods of supporting and/or storing fuel. A further need exists for modular fuel storage that may accommodate various configurations.

SUMMARY OF THE INVENTION

Methods and systems for modular fuel storage and transportation are provided. In an embodiment, a fuel storage system includes one or more fuel containers each supported by a fuel container support assembly. The fuel storage system may be mounted to a transportation device such as a vehicle or used in a stand-alone fashion. Each support assembly may include a plurality of detachable end support members such as end support members configured to support the end portions of the fuel container and side support members configured to support and/or connect the end support members. Some of the end support members may include neck grooves such that when the end support members are coupled, the neck grooves form an enclosure around the neck portion of the fuel container. In an embodiment, the support assembly is configured to facilitate release of excess pressure in the fuel container.

According to an aspect of the present invention, a fuel container support assembly for supporting a fuel container. The fuel container support assembly comprises an end frame comprising a first end support member and a second end support member that are detachably coupled to provide support for a neck portion of the fuel container; and a plurality of side support members detachably coupled to the end frame to protect a body portion of the fuel container.

In some embodiments, at least one of the side support members can be detachably coupled to both the first end support member and the second end support member. The first end support member and the second end support member can be interchangeable. Similarly, the plurality of side support members can be interchangeable.

In some embodiments, the first end support member and the second end support member each comprises a neck groove such that when the first end support member is coupled to the second end support member, the respective neck grooves form an enclosure around the neck portion of the fuel container. The first end support member and the second end support member can be coupled via a fastener. The fastener can include a wedge or a bolt.

In some embodiments, the first end support member can include an opening that is configured to facilitate release of excess pressure from the fuel container.

In some embodiments, the fuel container support assembly can further include a second end frame comprising a third end support member and a fourth end support member that are detachably coupled to provide support for a bottom portion of the fuel container.

In some embodiments, the fuel container support assembly can further include a trailing edge fairing usable for reducing drag caused by wind, the trailing edge fairing detachably coupled to at least one of the first end support member or the second end support member.

According to another aspect of the present invention, a fuel storage system is provided. the fuel storage system comprises one or more fuel container support assemblies, each configured to support a fuel container and comprising one or more openings configured to allow release of excess pressure from the fuel container, the one or more fuel container support assemblies arranged such that the openings for the one or more fuel container support assemblies form a channel for releasing excess pressure from the corresponding fuel containers supported by the one or more fuel container support assemblies.

In some embodiments, each of the one or more fuel container support assemblies comprises an end frame comprising a first end support member and a second end support member that are detachably coupled to provide support for a neck portion of a fuel container and a plurality of side support members detachably coupled to the end frame to protect a body portion of the fuel container. At least some of the one or more fuel containers support assemblies can be configured to be coupled to another fuel container support assembly. The first end support member and the second end support member can be interchangeable. Similarly, the plurality of side support members can be interchangeable. In some embodiments, the first end support member and the second end support member can be detachably coupled via a groove and a wedge.

According to another aspect of the present invention, a method for supporting a fuel container is provided. The method comprises providing a partially-assembled support assembly comprising a first end support member configured to support a neck portion of the fuel container and one or more side support members detachably coupled to the first end support member, the one or more side support members being configured to protect a body portion of the fuel container; loading the fuel container onto the partially-assembled support assembly such that the neck portion of the fuel container is supported by the first end support member and the body portion of the fuel container is substantially enclosed by the one or more side support members; and attaching a second end support member to the partially-assembled support assembly such that the neck portion of the fuel container is substantially enclosed by the first end support member and the second end support member.

In some embodiments, attaching the second end support member can include coupling the second end support member to the first end support member. Attaching the second end support member can further comprise coupling the second end support member to at least one of the one or more side support members. The method can further comprise attaching a collar to the neck portion of the fuel container prior to loading the fuel container onto the support assembly.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 2a-d illustrate exemplary ways support assemblies of a fuel storage system may be configured.

FIG. 7b illustrates an exemplary pair of a wedge and a groove, in accordance with an embodiment.

DETAILED DESCRIPTION OF THE INVENTION

Figure 1A:
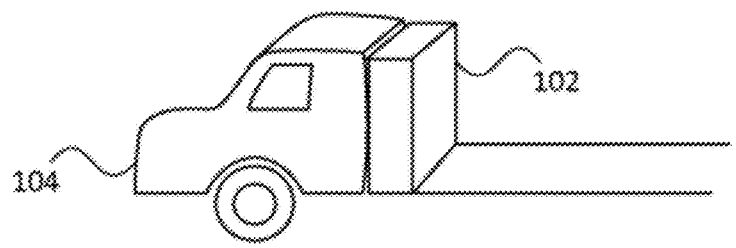
FIGS. 1a-d illustrate exemplary ways a fuel storage system may be attached and/or mounted to a vehicle.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention provides systems and methods for storing and/or transporting fuels in accordance with aspects of the invention. Various aspects of the invention described herein may be applied to any of the particular applications set forth below or for any other types of tank attachment systems. The invention may be applied as a standalone system or method, or as part of a system (such as a vehicle) that utilizes fuel. It shall be understood that different aspects of the invention can be appreciated individually, collectively, or in combination with each other.

FIGS. 1a-d illustrate exemplary ways a fuel storage system 102 may be attached and/or mounted to a vehicle 104. In various embodiments, a vehicle 104 may refer to any mobile machine or device designed or used to transport passengers or cargos. Examples of a vehicle may include bikes, cars, trucks, buses, motorcycles, trains, ships, boats, aircrafts and the like. A truck may include a light duty truck (e.g., class 1, class 2 or class 3), medium duty truck (e.g., class 4, class 5 or class 6), or heavy duty truck (e.g., class 7 or class 8). In some embodiments, the vehicles may be cars, wagons, vans, buses, high-occupancy vehicles, dump trucks, tractor trailer trucks, or any other vehicles. While a vehicle is illustrated herein, any other live or inanimate object or system (e.g., a building, a person, an animal, and a robot) may be attached to the fuel storage system discussed herein in any suitable manner including but not limited to the examples discussed herein.

In some embodiments, a fuel storage system 102 may be configured to support one or more fuel containers or vessels with the same or different characteristics. The fuel containers may be of any size, capacity, shape and/or weight and may be made of any suitable material. For example, the fuel containers may have a shape that is substantially cylindrical, rectangular, spherical, or the like. In addition, the fuel container(s) may be used to store any type(s) of fuel such as solid (e.g., coal), liquid (e.g., diesel) or gaseous fuels (e.g., natural gas). For example, gaseous fuels may include hydrogen or hydrogen based gas, hythane, H2CNG, or any other gas.

In some embodiments, a fuel container may be configured to store fuel at or above a certain amount of pressure and/or at or below a certain temperature. For example, the fuel container may be configured to store liquefied natural gas (LNG) at or below a predetermined temperature (e.g., −260 F) or compressed natural gas (CNG) at or above a predetermined pressure (e.g., 3,600 psi). In some embodiments, the fuel containers may be constructed according standards promulgated by organizations such as the International Organization for Standardization (ISO).

Figure 1B:
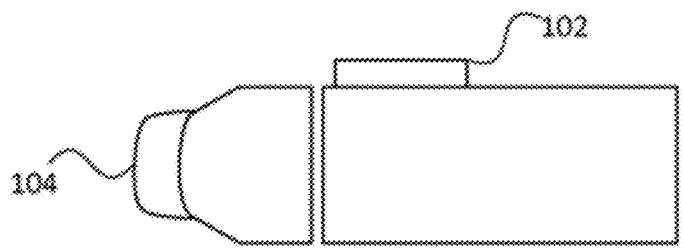
Figure 1C:
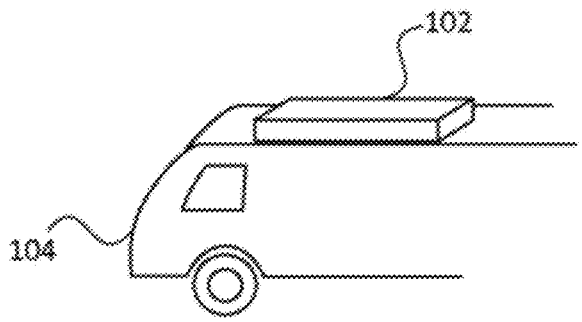
Figure 1D:
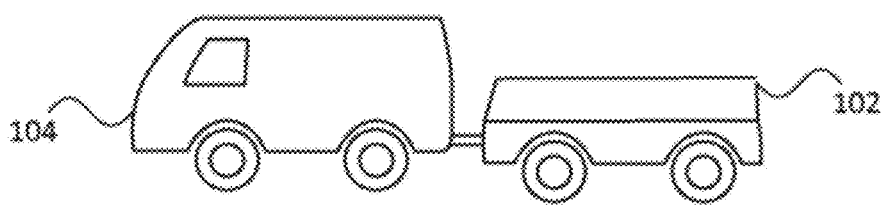

As illustrated by FIGS. 1a-d, a fuel storage system 102 may be mounted or attached to any suitable portion(s) of a vehicle 104. In an embodiment, such as illustrated in FIG. 1a (showing a side view of the vehicle 104), the fuel storage system 102 may be mounted behind a cab of the vehicle 104, for example, on the frame rail of the vehicle 104. In another embodiment, such as illustrated in FIG. 1b (showing a top view of the vehicle), the fuel storage system 102 may be mounted on one or both sides of the vehicle 104. In another embodiment, such as illustrated in FIG. 1c (showing a side view of the vehicle 104), the fuel storage system 102 may be mounted on the top of the vehicle 104, for example, on or in the roof of the vehicle. In yet another embodiment, such as illustrated in FIG. 1d (showing a side view of the vehicle 104), the fuel storage system 102 may be mounted on a trailer or a detachable portion of a vehicle 104. In other embodiments, a fuel storage system may be mounted to a vehicle using a combination of the illustrated methods. Variations of above-described embodiments are also within the scope of the invention. For example, the fuel storage system may be installed in the front or back of the body of a vehicle. In various embodiments, the location and/or manner of attachment of the fuel storage system to the vehicle may be based on a variety of factor including the capacity and type of the fuel containers, type of the vehicle, business requirement, and the like.

In some embodiments, at least some of the fuel stored in the fuel storage system 102 may be used to power and/or propel the vehicle 104 that carries the fuel storage system 102. The fuel may be a gaseous fuel, such as natural gas. The fuel may be contained within a gaseous fuel containing device, such as a tank, vessel, or any other type of device capable of containing a gaseous fuel. Any description herein of a fuel tank, vessel, or any other type of gaseous fuel containing device may be applicable to any other type of gaseous fuel containing device. The gaseous fuel containing device may be capable of containing a fuel with a certain amount of pressure. For example, the gaseous fuel containing device may be capable of containing a fuel having less than or equal to about 10000 psi, 8000 psi, 7000 psi, 6500 psi, 6000 psi, 5500 psi, 5000 psi, 4750 psi, 4500 psi, 4250 psi, 4000 psi, 3750 psi, 3500 psi, 3250 psi, 3000 psi, 2750 psi, 2500 psi, 2000 psi, 1500 psi, 1000 psi, 500 psi, 300 psi, 100 psi, or less.

In other embodiments, none of the fuel stored in the fuel storage system 102 is actually used to power the vehicle 104. Such may be the case for a mobile fuel station (similar to that illustrated by FIG. 1d) that is used to provide fuel in contingency or emergency situations.

In some embodiments, the fuel storage system may include one or more modular fuel container support assemblies (hereinafter support modules or support assemblies) used to support and/or secure fuel containers such as described above. In a typical case, a support assembly is configured to support only one fuel container. Alternatively, a support assembly may be used to support more than one fuel containers. Such support assemblies may be used to stabilize, support or otherwise protect the fuel containers from damage caused by movement (such as during transit), external impact, natural elements, erosion, and the like.

In various embodiments, a fuel storage system described herein may include an arbitrary number of support assemblies and the support assemblies of the fuel storage system may be arranged according to different configurations to accommodate different requirement or circumstances, such as storage space dimensions, weight restrictions, and the like. For example, the configuration of the support assemblies may be customized to fit a particular storage space (e.g., on a vehicle, in a warehouse). As another example, the support assemblies of the fuel storage system may be detachably coupled to each other or separately located.

FIGS. 2a-d illustrate exemplary ways support assemblies of a fuel storage system may be configured. In the examples, each rectangle prism 202 is used to represent a support assembly that is configured to support a fuel container therein. While the support assemblies discussed herein are illustrated as rectangular prisms, it is understood that, in various embodiments, the support assemblies may take on any suitable shapes such as cylinder, spheroid, triangular prism, and the like. In some embodiments, the support assemblies are shaped to improve spatial efficiency, weight, cost, and the like, of the overall fuel storage system. For example, support assemblies shaped like rectangular prisms can be easily stacked or placed adjacent to each other, thereby providing spatial efficiency. In an embodiment, such as illustrated in FIG. 2a, the support assemblies 202 may be stacked on top of each other along one of the four side surfaces in a substantially vertical fashion. In another embodiment, such as illustrated in FIG. 2b, support assemblies 202 may be arranged along one of the four side surfaces in a substantially horizontal fashion. In another embodiment, such as illustrated in FIG. 2c, support assemblies 202 may be arranged along one of the two end surfaces in a substantially horizontal fashion. In yet another embodiment, such as illustrated in FIG. 2d, support assemblies 202 may be arranged along one of the two end surfaces in a substantially vertical fashion. In other embodiments, the support assemblies 202 may be arranged using a combination of the illustrated methods or using any other suitable methods. For example, the support assemblies 202 may be arranged in two-dimensional or three-dimensional arrays or to form other regular or irregular shapes. Advantageously, the structure of the support assemblies described herein allows the support assemblies to be arranged into arbitrary configurations to accommodate any particular requirement or limitation (e.g., space restriction).

In various embodiments, support assemblies 202 such as illustrated in FIGS. 2a-d may or may not be coupled (e.g., detachably or permanently) to the other support assemblies to form a configuration. In some embodiments, two support assemblies may be coupled or affixed to each other using one or more fasteners. The fasteners may be an inherent part of support assemblies (e.g., tongue and groove, wedge and slide, joints and the like) or external to the support members (e.g., wires, locks, glue, welding, and the like). Exemplary means of fastening two or more support assemblies may include nuts and bolts, nails, locks, latches, wires, joints, soldering, welding, gluing and the like. In other embodiments, the support assemblies may simply be placed or stacked adjacent to one another without any fastening mechanism.

A fuel storage module may or may not share component(s) with adjacent module(s). Any means of fastening may be used to couple two fuel storage modules such as using nuts and bolts, nails, locks, latches, wires, grooves and slides and the like.

Figure 3:
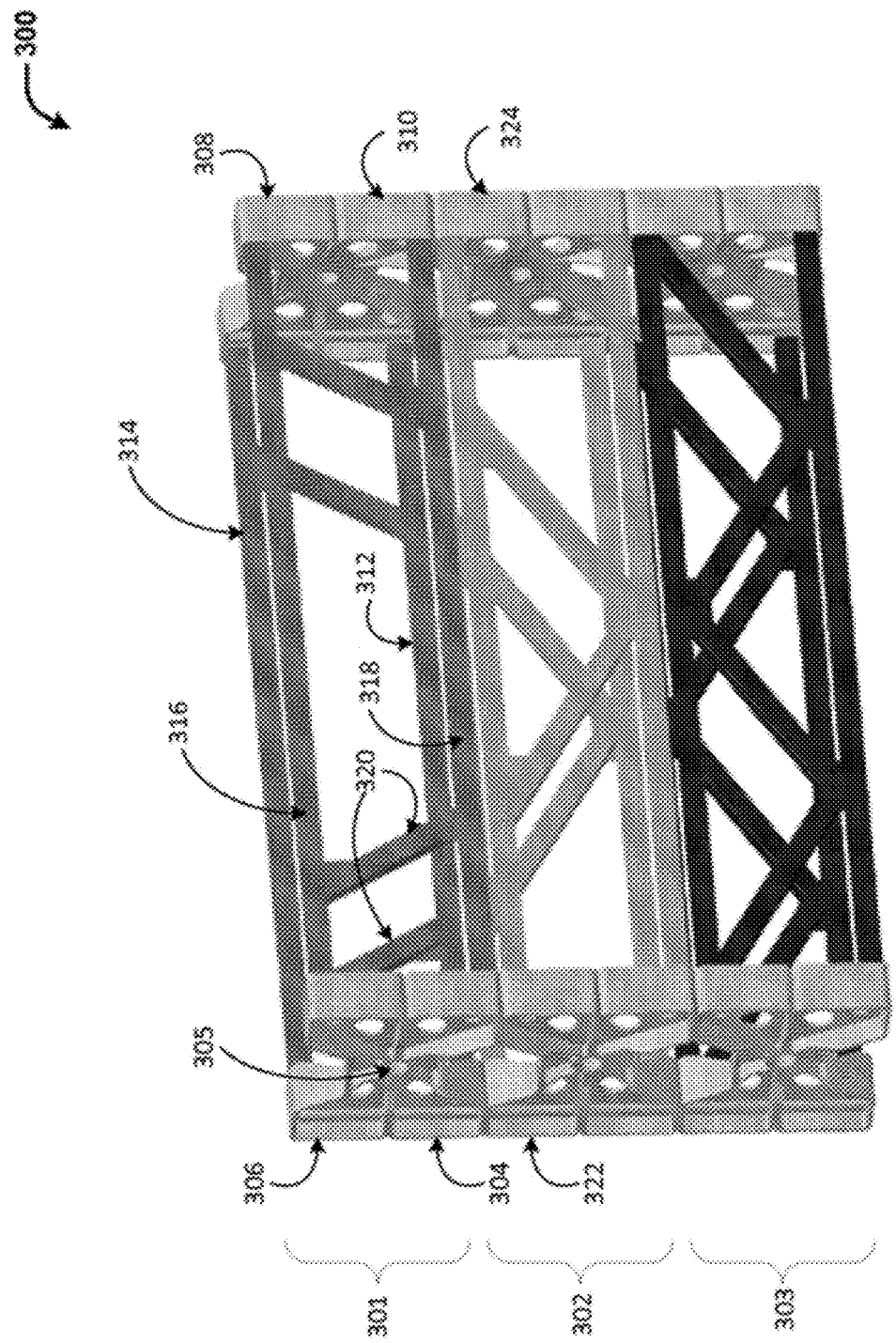
FIG. 3 illustrates an exemplary fuel storage system, in accordance with an embodiment.

FIG. 3 illustrates an exemplary fuel storage system 300, in accordance with an embodiment. The fuel storage system 300 comprises three support assemblies 301, 302 and 303. In other embodiments, the fuel storage system may include more or less than three support assemblies. As discussed above, support assemblies may be stacked or otherwise arranged to improve spatial efficiency. In this example, three support assemblies 301, 302 and 303 are stacked on top of each other in a configuration similar to that illustrated in FIG. 2a. In other embodiments, the support assemblies may be arranged in other suitable configurations.

In the illustrated embodiment, each support assembly includes two opposing end frames and a plurality of (e.g., two) side frames. An end frame may be used to protect a portion at or near an end of a fuel container supported by the support assembly. The end frame may comprise a single end support member or two or more detachably-coupled end support members such as 304 and 306 or 308 and 310. The end frame may provide support for the distal portions of the fuel containers supported by the support assemblies. In an embodiment, the end support members may be configured to interface with a portion of the fuel container. For example, end support members 304 and 306, when coupled, may form an enclosure 305 shaped to interface with a top or neck portion of the fuel container. For another example, end support members 308 and 310 may be coupled to provide support for a bottom portion of fuel container.

The two end frames of a support assembly may be identical or different. In some embodiments, one of the end frames may be configured to support or interface with a particular end (e.g., top) of a fuel container while the other end frame is may be configured to support or interface with the opposite end (e.g., bottom) of the fuel container. Thus, the two end frames may be different. For example, the top end frame may include an opening for supporting the neck of the fuel container while the bottom end frame may not have such an opening. Thus, the end support members for the bottom portion of the fuel container may not be configured to provide support for the top portion of the fuel container. In some other embodiments, the two end frames may be substantially similar, such as illustrated in FIG. 3. For example, the end support members 308 and 310 may be substantially the same as end support members 304 and 306, respectively. In such cases, both end frames may be configured to support or interface with both the top and the bottom of a fuel container. For example, in some cases, both the top portion and the end portion of the fuel container may have neck portions that are supported by the end support members of the end frames. In some instances, the two end frames of the support assembly and the components thereof may be interchangeable, thereby lowering the cost of manufacturing and/or assembly of the fuel module.

In some cases, an end frame may include only one single end support member instead of two coupled end support members to provide support to a top or bottom portion of a fuel container. Such a single support member may or may not resemble the structure formed by the coupled end support members discussed above. For example, the single end support member may or may not include an enclosure similar to the enclosure 305 to interface with a top portion of the fuel container.

In some cases, an end frame may include more than two end support members that are detachably coupled to support a top and/or bottom portion of a fuel container. For example, in an embodiment, four end support members may be coupled to form an end frame similar to the enclosure 305 illustrated in FIG. 3. In an embodiment, the end frames described herein are configured to support the weight of a fuel container supported therein. In an embodiment, two or more end support members of an end frame may have similar shapes and/or substantially symmetric along an interface where the two or more end support members are coupled. For example, two end support members 304 and 306 have substantially the same shapes and are substantially mirror-images of each other along the interface where the end support members are coupled. As discussed above, having such interchangeable and/or identical end support members can help lower the cost of manufacturing and/or assembly.

A support assembly can further include a plurality of side support members to prevent or reduce movement or damage to the body or sides of a fuel container supported therein. As used herein, the term "side support member" is used to refer to the component of the support assembly that protects one side (but not the top or bottom) of a fuel container. In one embodiment, the side support member may be formed by a single-piece surface structure. In other embodiments, such as illustrated in FIG. 3, a side support may be formed by a top side frame (e.g., side frame 316) and a bottom side frame (e.g., side frame 318) with zero or more truss members 320 in between. Such a structure can help reduce the weight of the side support member.

A support member can includes a plurality of side frames such as 312 and 314 or 316 and 318. In some embodiments, the planes formed by the side frames may be substantially parallel to each other. For example, the plane formed by side frames 312 and 314 may be substantially parallel to the plane formed by side frames 316 and 318. In other cases, the planes formed by the side frames may intersect each other, for example, in a "v" manner.

In an embodiment, one, two, three or more side support members may be used to connect and/or secure the two end frames such as described above. For example, in an embodiment, a support assembly may comprise two side support members each formed by a top side frame and a bottom side frame with zero or more truss members in between may be coupled to and all four end support members of a support assembly such as illustrated in FIG. 3. In another embodiment, a support assembly may comprise only one side support member that may be coupled to all four end support members. In yet another embodiment, a support assembly may include four side support members each connecting the two end frames.

A side frame may be configured to couple with an end frame at each end of the side frame. Thus, the two ends of the side frame may be coupled to two opposite facing end frames. Where the end frame comprises one or more end support members, one end of the side frame may be configured to couple with at least one end support members. For example, side frame 312 is coupled at one end to end support member 304 and at another end to end support member 310. In various embodiments, a side frame may be coupled to an end support member in any suitable manner such as via a fastener (e.g., bolt) or being plugged directly into a socket or opening provided by the corresponding end frame or end support member. In some cases, the side frame may be easily attached to and/or detached from an end frame to lower the cost of associated with assembly and/or dissembling of the support assembly.

As discussed above, a side support member may be formed by a top side frame (e.g., side frame 316) and a bottom side frame (e.g., side frame 318) with zero or more truss members 320 in between. The truss members 320 may include one or more slanted bars such as shown in FIG. 3. In other embodiments, the truss member 320 may include other patterns. The truss members may be permanently attached (e.g., welded or soldered) or detachably attached to the side frames. In general, the design of the side frames and/or the truss members between the side frames may be based on a variety of factors such as dimensions and/or capacity of the fuel container supported thereby, material used to construct the side frames and/or truss members, strength-to-weight ratio requirement, location or position of the support assemblies in a configuration, aesthetic reasons and the like. In various embodiments, some or all of the components of the side support member (e.g., side frames) may be interchangeable to easy the manufacturing, assembly, and/or disassembly of the support assembly.

In various embodiments, a support assembly may comprise any number of attachable and/or detachable components or members. For example, in an embodiment, a support assembly may include four components including two single-piece end frames and two side supports that connect the two end frames. In another embodiment, such as illustrated in FIG. 3, a support assembly may include six components including two pairs of end support members where each pair may be coupled to form an end frame and two side supports, each of which may be used to hold together all four of the end support members. In yet another embodiment, a support assembly may include eight components including two pairs of end support members described above and four side frames, each side frame used to connect two opposite-facing end support members.

In various embodiments, a support assembly may comprise any number of distinctly shaped components. For example, in an embodiment, a support assembly may require only two distinctly shaped components, one for an end support, one of a side support. In such an embodiment, two or more identical end support members may be coupled to form an end frame and one or more identical side supports may be used to connect the end frames. By reducing the number of distinct parts and increasing the number of interchangeable parts of a support assembly, the techniques described herein advantageously eases the task of manufacturing, assembly, and/or disassembly of such support assemblies. For example, such an approach may lower the cost of manufacturing by reducing the number of distinct pieces to manufacture and/or lower the cost of assembly by reducing the risk of assembly error. In other embodiments, a support assembly may require more than two distinctly shaped components. For example, the end support members for the top of the fuel container may be different from the end support members for the bottom of the fuel container. For another example, the side supports for the support assembly may be of different shapes. The particular number of components and/or shapes of the components may be determined by cost, fuel container type, fuel type, vehicle type, mounting environment and/or other considerations.

In some embodiments, the side frames may be designed to hold a fuel container in one or more orientations. For example, in an embodiment, the distance between one pair of side frames (e.g., side frames 312 and 318) may be less than the distance between another pair of side frames (e.g., side frames 314 and 316) so as to support a fuel container in a substantially horizontal manner (e.g., with the narrow pair of side frames 312 and 318 at the bottom and the wider pair of side frames 314 and 316 at the top). In another embodiment, the distance between one pair of side frames may be substantially similar to the distance between another pair of side frames so as to support fuel containers held either substantially vertically or horizontally.

In some instances, the support assemblies located toward the bottom of a stack of support assemblies (e.g., support assembly 303 in FIG. 3) may be designed to be more durable or capable of withholding more impact than the support assemblies located toward the top of the stack (e.g., support assembly 301 in FIG. 3). For example, as illustrated in FIG. 3, the truss members between side frames for the bottommost support assembly 303 may be configured to withhold more impact than the truss members for the support assemblies on top of it (e.g., support assemblies 301 and 302) making it sturdier than the other of the support assemblies laid on top of it. In contrast, minimal truss members may be supported for the topmost support assembly 301. In some embodiments, the body portion of a fuel tank at least partially enclosed by the planes formed by the side frames of a fuel container support assembly. In general, various support assemblies with the same or different characteristics may be mixed-and-matched to suit the need of particular configurations of the support assemblies.

In various embodiments, components or portions of a support assembly described herein (e.g., end support members, side frames, truss members, side support) may be constructed using any suitable material or combination of materials. For example, the materials used may include metal such as steel, iron, aluminum, titanium, copper, brass, nickel, silver and the like or any alloys or combinations thereof. The materials may also include a polymer or a composite material, such as carbon fiber, or fiberglass. The choice and amount of materials used may be based on various factors including cost, strength-to-weight ratios, location or position of the support assemblies in a configuration, aesthetic reasons and the like. In some instances, the support assemblies located toward the bottom of a stack of support assemblies (e.g., support assembly 303 in FIG. 3) may be designed with a more durable and/or heavier material than the material used for the support assemblies located toward the top of the stack (e.g., support assembly 301 in FIG. 3). In various embodiments, the dimensions of components or portions of a support assembly described herein (e.g., end support members, side frames) may be based at least in part on the characteristics of fuel containers (e.g., dimensions, capacities, type of fuel) supported therein, space considerations for the support assemblies, and the like.

A uniform interface for connection may be provided between components of a support assembly to lower the cost of manufacturing, assembly, and/or disassembly of the support assembly. As such, during assembly of a support assembly, the components may be mixed-and-matched. For example, in an embodiment, different components of the support assembly may be connected using a LEGO-like interface For example, the interface for coupling a side frame and an end support member may be the same between any side frame and end support member. Besides facilitating connection between internal components of a support assembly, such uniform interface may allow one support assembly to be coupled externally to another support assembly. For example, as shown in FIG. 3, support assemblies 301, 302 and 303 are stacked vertically along their side support members or side frames. The side support members and/or end frames may provide fastening mechanisms for affixing two adjacent support assemblies. Thus, the end support members may be coupled or connected without the use of additional hardware. Additionally, adjacent support assemblies may be coupled by external fasteners such as nuts and bolts to better secure the support assemblies. For instance, such fasteners may be used to couple end support members 304 and 322 and/or to couple end support members 310 and 324. In yet other embodiments, the support assemblies may be arranged (e.g., stacked or placed adjacent to each other) without being coupled or connected.

Figure 4:
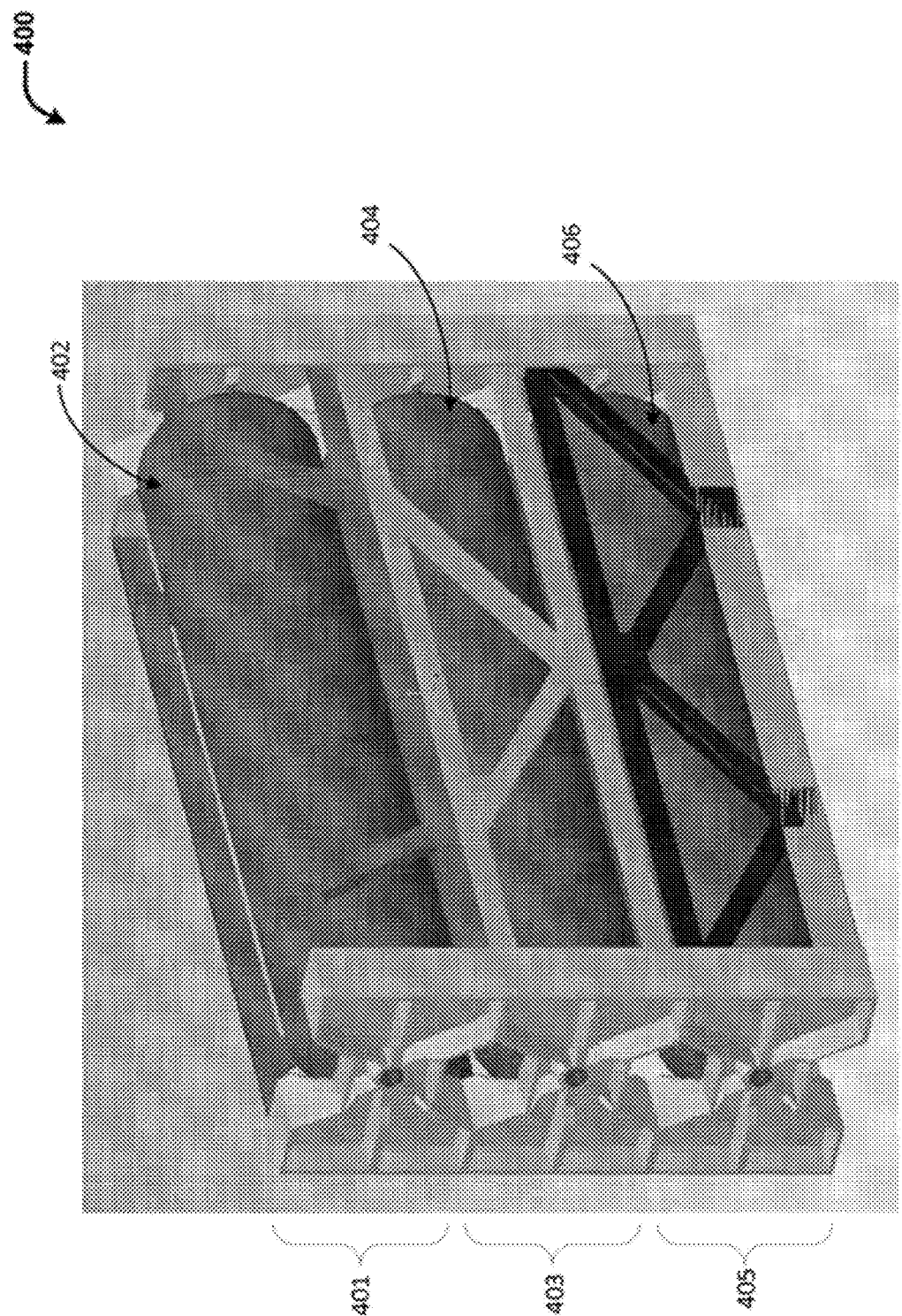
FIG. 4 illustrates an exemplary fuel storage system with fuel containers, in accordance with an embodiment.

FIG. 4 illustrates an exemplary fuel storage system 400 with fuel containers, in accordance with an embodiment. The fuel storage system 400 includes multiple support assemblies 401, 403 and 405 that are configured, such as in a manner similar to that described in connection with FIG. 4, to support multiple fuel containers 402, 404 and 406, respectively. In an embodiment, support assemblies 401, 403 and 405 can be stacked so as to prevent or reduce movement relative to one another. In some cases, the top portions of the fuel containers 402, 404 and 406 stored therein may be sandwiched between the end support members of the support assemblies to further secure the fuel containers. In another embodiment, the fuel storage system 400 may include a multi-container support assembly rather than multiple detachable support assemblies. For example, a three-container support assembly may include three stacked single-container support assemblies where the end frames are welded together while the side frames may be detachable to facilitate loading and/or unloading of the fuel containers. In an embodiment, support assemblies 401, 403 and 405 can be stacked so as to prevent or reduce movement relative to one another. The ends of the fuel containers 402, 404 and 406 stored therein may be sandwiched between the end support members of the support assemblies. As discussed above, for each support assembly, the end support members may be connected by one, two or more side supports. A side support may include, for example, two substantially parallel side frames and zero or more truss members in between the side frames.

Figure 5:
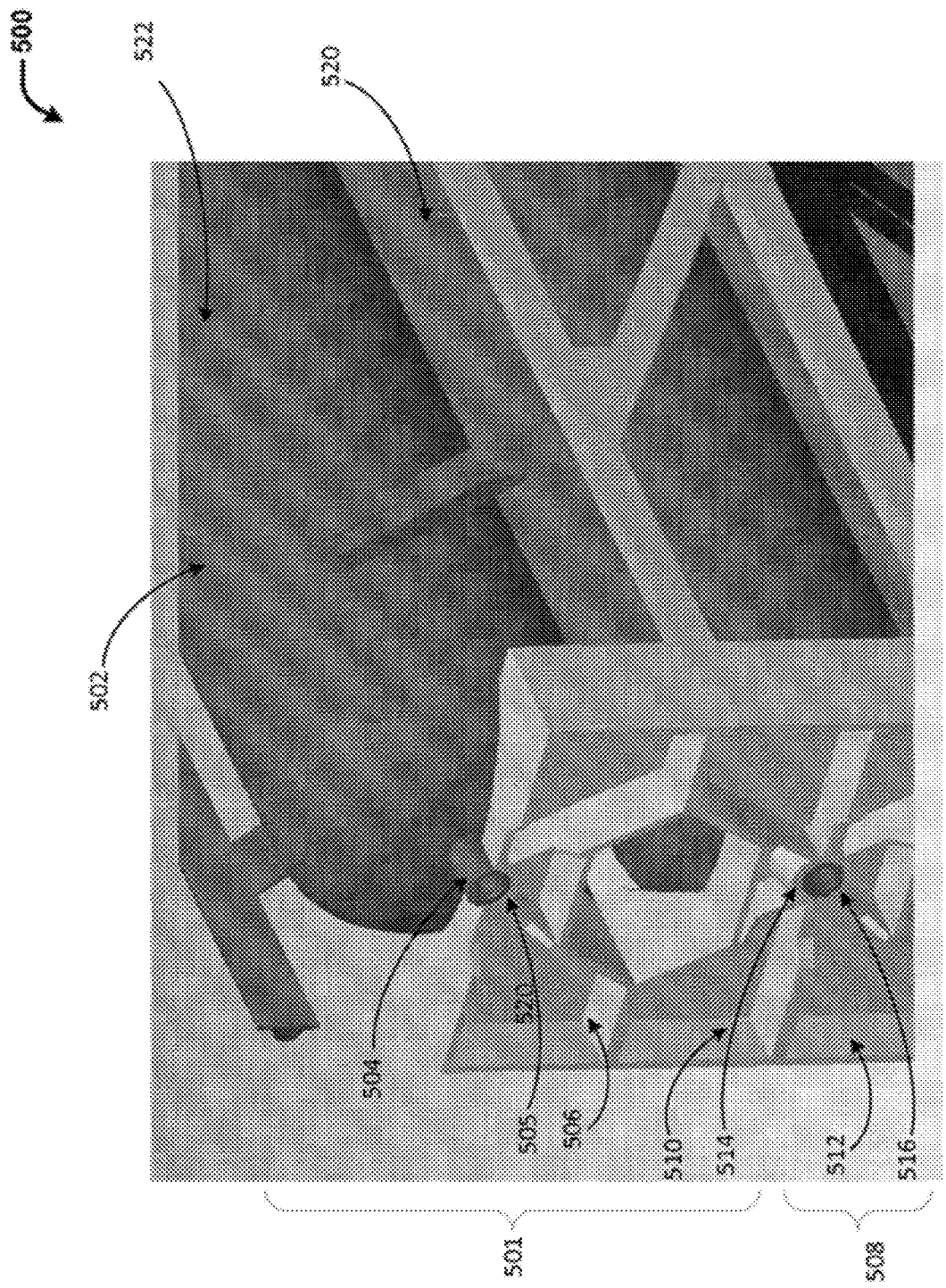
FIG. 5 illustrates a portion of a fuel storage system, in accordance with an embodiment.

FIG. 5 illustrates a portion of a fuel storage system 500, in accordance with an embodiment. The fuel storage system 500 may include multiple support assemblies such as discussed above. In particular, the end frame of the support assembly may comprise two detachably coupled end support members. One of the two end support members may be removed to allow the loading of a fuel container. In particular, a fuel container 502 is loaded into a support assembly 501 (such as described in connection with FIG. 4). The neck portion 504 of the fuel container 502 may rest on a neck groove 505 on a first end support member 506. Such a neck groove 505 may include a hollow concave shaped to interface with a neck portion of the fuel container. A second end support member (not shown) may have a matching neck groove such that when the second end support member is coupled to the first bottom end support member 506, the neck portion 504 of the fuel container 502 is substantially enclosed, clamped or otherwise protected by an enclosure formed by the neck grooves of the first and second end support members. In various embodiments, the shape and dimensions (e.g., diameter, length) of the enclosure formed by the neck grooves may be configured to secure or protect the neck portion of the fuel container. For example, where the intersection of the neck portion is a circle, the shape of the enclosure may resemble a circle and an intersection of the neck grove 505 may resemble a portion of a circle such as a semi-circle. Where the intersection of the neck portion is a rectangle, the shape of the enclosure may resemble a rectangle. In an embodiment, the enclosure may form an opening through an end frame such that the top of the fuel container is visible from the other side of the end frame. In another embodiment, the enclosure may form a hollow cavity but not an opening in the end frame such that the top of the fuel container is not visible from the other side of the end frame.

Similarly, support assembly 508 (partially shown) provides an example of an assembled support assembly with a loaded fuel container. As illustrated, an end support member 510 with neck groove 514 is coupled to another end support member 512 with neck groove 516 are coupled such that the neck grooves 514 and 516 form an enclosure around the neck portion of the fuel container supported by the support assembly.

FIG. 5 also illustrates exemplary methods for loading a fuel container into a support assembly and unloading a fuel container from a support assembly. In an embodiment, opposite-facing end support members may be coupled to one or more side frames such as side frame 520 to form a partially assembled support assembly such as 501. At least one of the end support members is not added to allow an opening through with a fuel tank may be loaded into the partially assembled support assembly. For example, as illustrated in FIG. 5, the top end support member corresponding to the bottom end support member 506 is not assembled. In other words, one end of the side frames such as 522 are not coupled directly to an end support member. Next, a fuel container such as fuel container 502 may be loaded into the support assembly such that at least a portion of the fuel container (e.g., the neck portion) interfaces (directly or indirectly) with an end support member such as end support member 506. Lastly, one or more end support member(s) similar to end support member 510 may be coupled to the existing end support member and/or one or more side frames such as side frame 522 to form a completely assembled support assembly such as support assembly 508. For example, one such end support member may be attached to from an end frame for the top portion of the fuel container and another end support member may be attached to form an end frame for the bottom portion of the fuel container.

To unload a fuel container supported by a support assembly described herein, at least one of the end support members of the support assembly (e.g., end support frame 510) before the fuel container may be lifted out of the support assembly. In some embodiments, at least one of the side frames may be also be removed to unload the fuel container.

Figure 6:
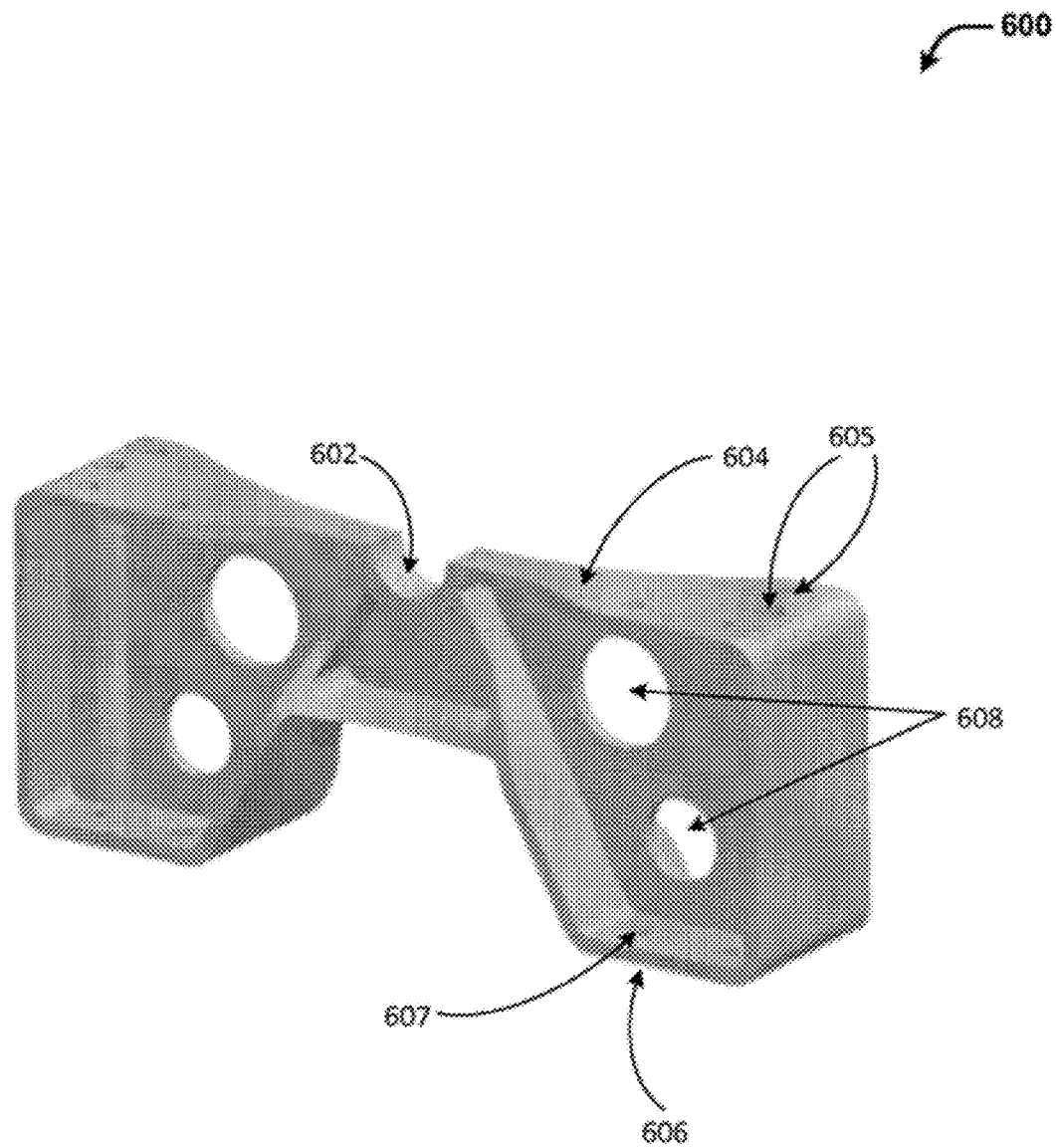
FIG. 6 illustrates an exemplary an end support member of a fuel container support assembly, in accordance with an embodiment.

FIG. 6 illustrates an exemplary end support member 600 of a support assembly, in accordance with an embodiment. In an embodiment, one, two or more end support members may be coupled to each other to form an end frame for supporting the top or bottom portion of a fuel container. In an embodiment, the end support member 600 has a neck groove 602 shaped to interface with a portion such as a neck portion of a fuel container. For instance, the neck groove 602 may have a hemispherical shape or a portion thereof.

In an embodiment, the end support member 600 includes an inner surface 604 and an outer surface 606 that are substantially parallel to each other. The neck groove 602 may be situated at or near the middle of the inner surface. The inner surface 604 may be configured to be coupled or adjacent to an inner surface of another end support member such that the neck grooves of the two end support members form an enclosure to support the neck portion of a fuel container, as described above. The inner surface 604 may include characteristics that support the coupling with another inner surface. For example, the inner surface may include one or more holes 605 for bolting or other similar purposes. The holes 605 may be used to thread pipes, wires, or other objects through the fuel storage system.

The outer surface 606 may be configured to be coupled or adjacent to an outer surface of an end support member of another support assembly, such as when the support assemblies are stacked on top of each other. The outer surface 606 may include characteristics that support the coupling with another inner surface. For example, the inner surface may include one or more holes 607 for bolting or other similar purposes. The holes 605 may be used to thread pipes, wires or other objects through the fuel storage system.

In various embodiments, the end support member may be constructed to improve durability, weight-to-strength ratio, reusability and other characteristics. For example, the end support member 600 may include one or more holes 608 to reduce overall weight of the end support member. As another example, the end support member 600 may be symmetric along an axis running through the center of the neck groove 602 to provide even distribution of the weight along the axis. As yet another example, the end support member 600 may include an arch structure below the neck groove to distribute the load similar to a bridge. Further, as discussed above, components or portions of the end support member described herein may be constructed using any suitable material or combination of materials such as described in connection with FIG. 4.

In various embodiments, the pair of end support members that may be coupled to form an end frame in a support assembly may be substantially the same or different. For example, in an embodiment, the pair of end support members may be interchangeable. One end support member may be stacked on another in a symmetric or mirror-image fashion. In another embodiment, the more weight-bearing support member of the pair of end support members may be constructed to be sturdier (e.g., using a more durable material) than the less weight-bearing member. In some embodiments, two or more end support members may be used to provide support for an end (top or bottom) portion of a fuel container. For example, in an embodiment, four end support members each with a curved neck groove may be coupled in a circle to form a circular neck enclosure similar to described above, where each of the four end support members may occupy a quadrant of the end frame.

Figure 7A:
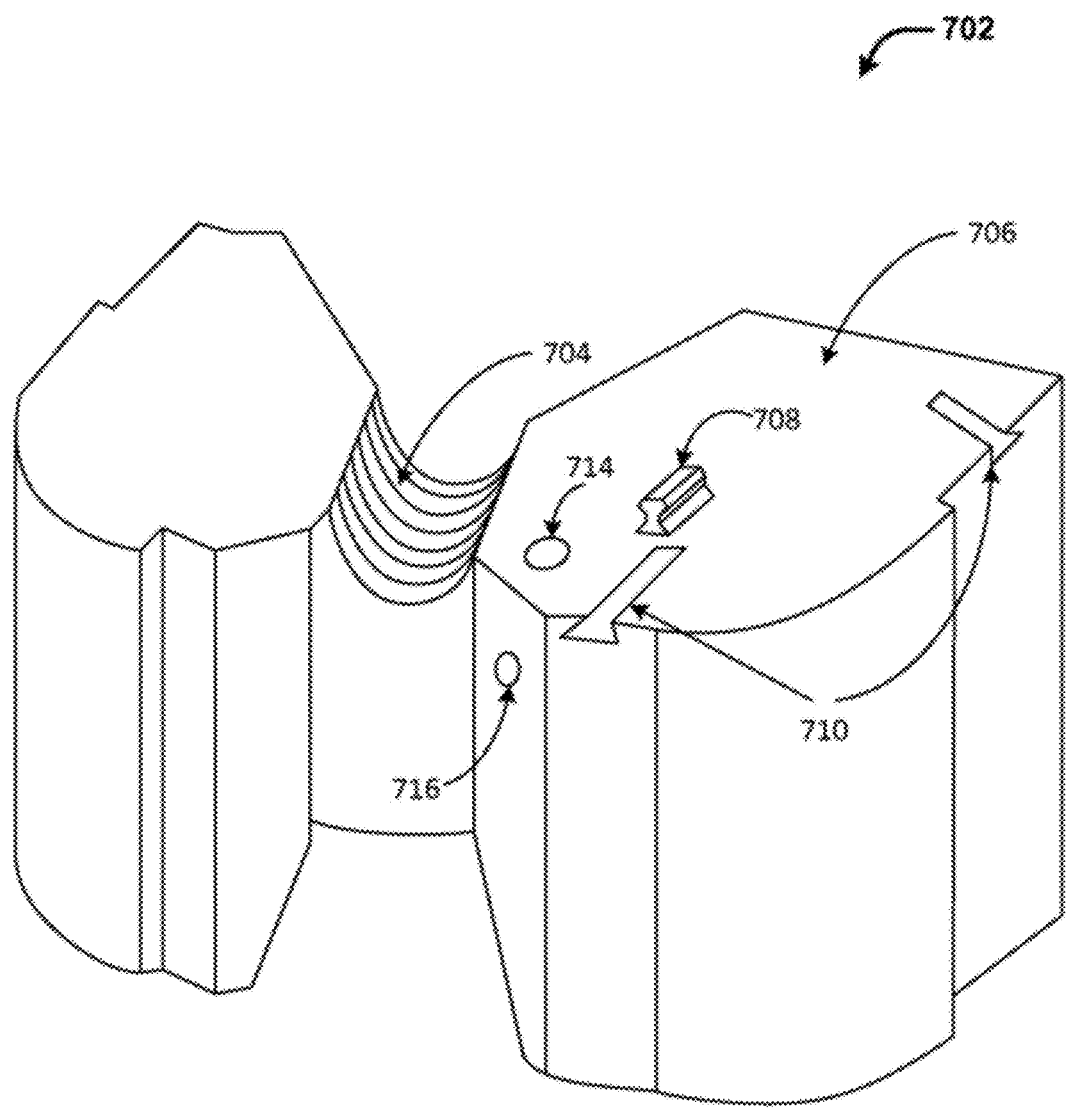
FIG. 7a illustrates another exemplary an end support member, in accordance with an embodiment.

FIG. 7a illustrates another exemplary an end support member 702, in accordance with an embodiment. In this example, the end support member 702 provides a neck groove 704 such as described in connection with FIG. 6. In some embodiments, the surface of the neck groove 704 may be constructed to provide support for at least a portion of a fuel container interfacing with the neck groove. For example, the surface of the neck groove 704 may include a plurality of threaded grooves substantially perpendicular to the longitude of the neck groove to provide better support of the neck portion of the fuel container. For example, the grooves may be provided to increase the friction between the neck portion of the fuel container and the end support member so as to prevent or reduce the movement of the fuel container longitudinally relative to the end support member.

In an embodiment, the end support member 702 also includes an inner surface 706 that may be coupled with an inner surface of another end support member of the same support assembly. In various embodiments, the pair of end support members may be coupled in any suitable manner. For example, in an embodiment, a wedge attached to the inner surface of an end support member may be engaged with a matching groove on the inner surface of another end support member. The wedge and groove may be of any shape or dimensions. For example, the wedges may be of a tapered shape such as illustrated by tapered wedge 708 and the corresponding groove may be of a tapered shape such as illustrated by grooves 710 and 712. In some embodiments, shapes of wedges and grooves other than illustrated may be used. In general, any shaped features such as illustrated may be provided to prevent the end support members from moving laterally or away from each other.

In some embodiment, an end support member may provide one or more wedge and/or one or more grooves. In an embodiment, the longitude of a groove may intercept with an edge of the inner surface of the end support (such as illustrated by groove 710 and 712) so that the groove may engage with a corresponding wedge of another end support member when the pair of end support members move relatively in a direction substantially parallel to the longitude of the groove.

In an embodiment, one or more such grooves may be provided for one end support member, the longitudes of the grooves may be associated with one or more directions. Such shaped features may be separate from the end support members or built-in as part of the end support members. For example, in an embodiment, one or more separate tapered wedges 708 or other shaped objects may be pressed into (or otherwise inserted into) one or more channels formed by matching grooves of two end support members when the end support members are stacked as mirror-images of each other.

In an embodiment, the end support member 702 may also include one or more openings, such as openings 714 and 716. In some instances, such openings may be used for venting excess pressure from a fuel container or for threading pipes or other objects through.

FIG. 7b illustrates an exemplary pair of a wedge and a groove, in accordance with an embodiment. The example provides an intersection view of a tapered wedge 720 of an end support member 722 and a tapered groove 722 of an end support member 726 such as described above in connection with FIG. 7a. The tapered groove 722 may be configured to engage with a portion of the tapered wedge 720 when the tapered wedge 720 is slid into the tapered groove 722, for example, in a direction substantially parallel to the longitude of the groove 722. In some embodiments, a gap 728 between the members 724 and 726 may result from a portion of the tapered wedge 720 that is not does not fit in tapered groove 722. Such a gap 728 may be desirable in some instances. For example, the gap may facilitate easy coupling and/or decoupling of a pair of end support members. Alternatively, there may be no gap between the coupled end support members. In some embodiments, wedge and the grove may be of shapes other than those illustrated herein.

Figure 8A:
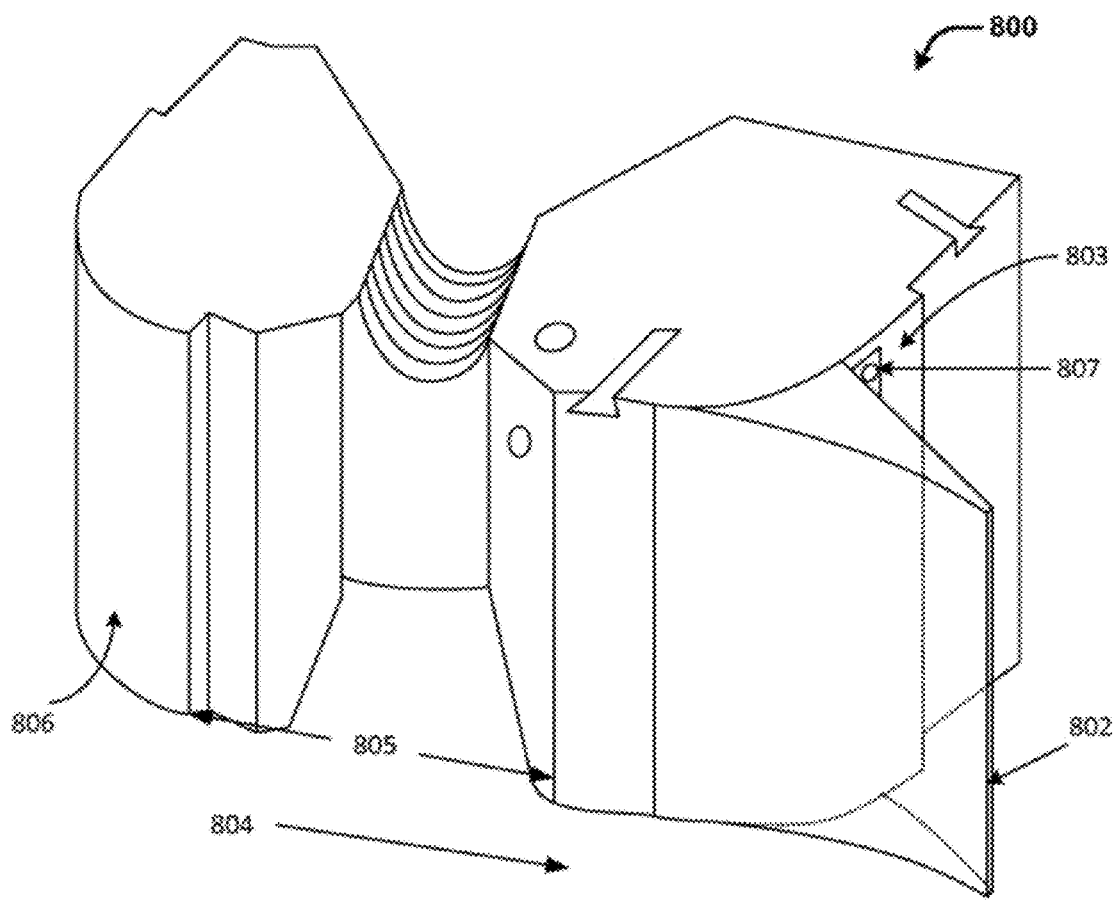
FIG. 8a illustrates another exemplary an end support member, in accordance with an embodiment.

FIG. 8a illustrates another exemplary end support member 800, in accordance with an embodiment. In this example, the end support member 800 may be similar to the end support member 702 discussed in connection with FIG. 7 except that the end support member 800 additionally includes a trailing edge fairing 802. Such a trailing edge fairing 802 may be attached (detachably or not) to a surface or side 803 of an end support member. In an embodiment, such a fairing may be used exposed outside a housing (e.g., a cab of a vehicle) for a support assembly while the rest of the support assembly may be covered or enclosed by the housing. The fairing may be used to removing the movement of the end support assembly, for example, relative to the housing of the support assembly.

In some embodiments, the fairing may be used to reduce drag that may exist, for example, when the end support member moves through the air as part of a fuel storage system mounted on a moving vehicle. For example, the fairing 802 may be coupled to the end support member 800 using a bolt 807. In some embodiments, the trailing edge fairing 802 may be attached or coupled to various portions of the end support member 800 based, for example, on the direction of the wind. For example, the configuration illustrated in FIG. 8a may be used to reduce drag caused by wind blowing in the direction indicated by the arrow 804. The trailing edge fairing may be attached to the other side 806 of the end support member 800 if the direction of the wind is reversed. In some embodiments, two or more edge trailing fairing may be provided, for example, one on each side of the end support member. In various embodiments, the trailing edge fairing may be constructed with material(s) similar or different to those used for the support assemblies based on considerations such as cost, weight, durability and other factors. For example, the trailing edge fairings may be constructed using light-weight materials such as aluminum or polymer.

Figure 8B:
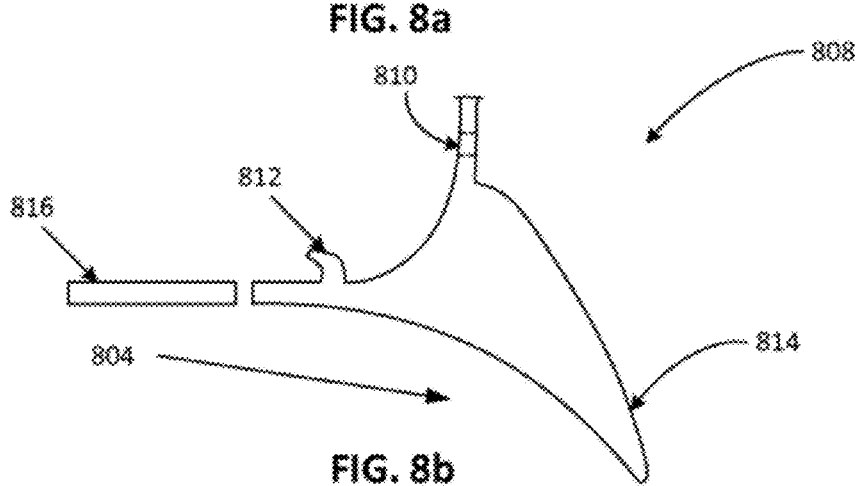
FIG. 8b illustrates exemplary components of a trailing edge fairing, in accordance with an embodiment.

FIG. 8b illustrates exemplary components of a trailing edge fairing 808, in accordance with an embodiment. This example provides a top intersection view of the fairing components including those illustrated in FIG. 8a. In this example, the trailing edge fairing 808 may include a fairing portion 814 that may be used to reduce drag. The fairing portion may be attached to an end support member, for example via nuts and bolts through one or more holes 810 and/or via a protruding wedge 812 that may fit into a groove along a side of the end support member. In other embodiments, the faring may be attached to the end support member via other means.

In an embodiment, one or more plate members 816 may be used to provide a smooth surface of an end support member to reduce drag, for example, by covering up the gap 805 between the two ends of the end support member. In some embodiments, such a plate members 816 may be coupled to an end support member with any fastening members such as glues, joints, tongue and grove, bolts, and the like.

Figure 9:
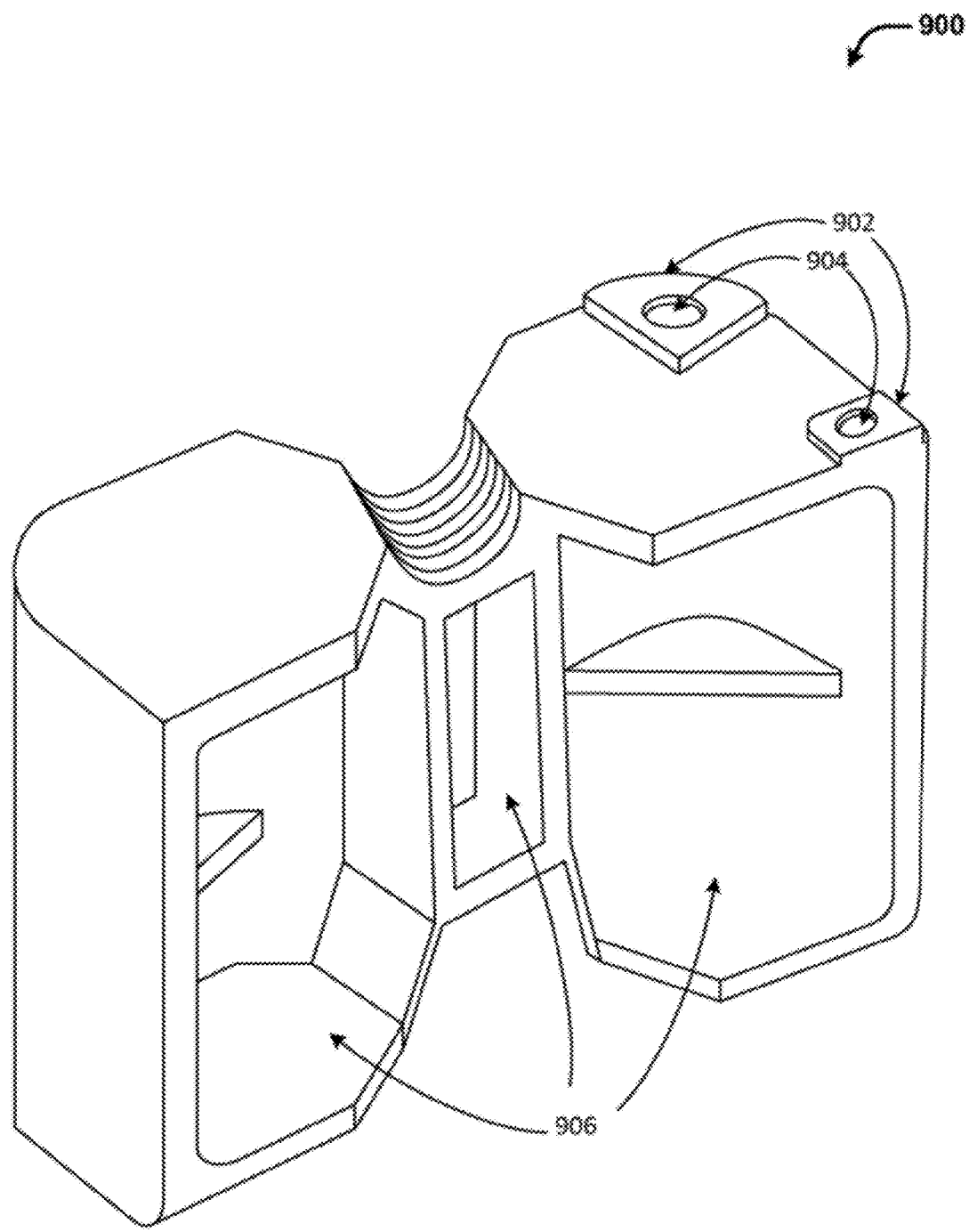
FIG. 9 illustrates another exemplary end support member, in accordance with an embodiment.

FIG. 9 illustrates another exemplary end support member 900, in accordance with an embodiment. In this embodiment, the inner surface of the end support member may include one or more slightly-raised plates 902. Such plates may include holes 904 used to for securing the end support member 900 with another end support member such as via nuts and bolts, wires, strings, ropes, buckles, pins, rings, and the like. In some cases, the raised plates may interface with a corresponding structure on the other end support member to provide stability. In some embodiments, the raised plates 902 may also be used to provide some spacing between the surfaces of end support members.

In an embodiment, the end support member includes hollow interiors 906 used to reduce overall mass of the end support member, increase the strength-to-weight ratio, providing housing for other components (e.g., piping) and the like.

Figure 10:
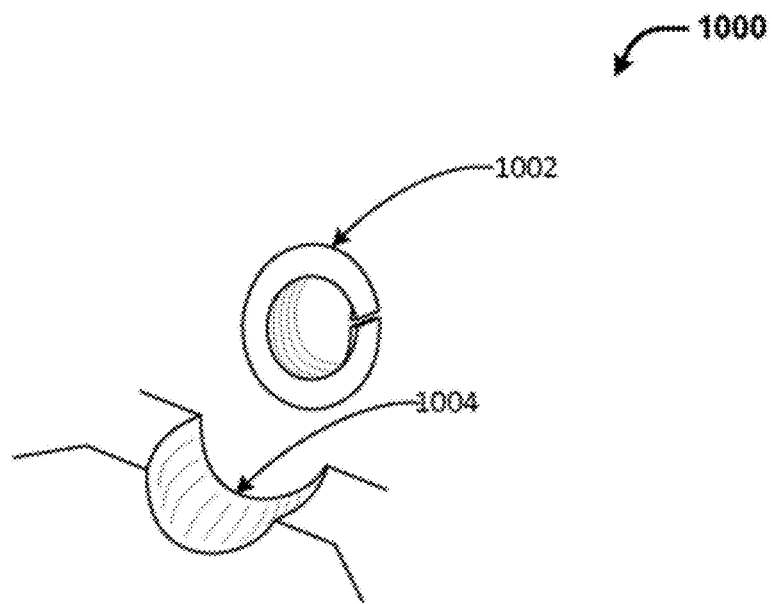
FIG. 10 illustrates an exemplary implementation of such an extra layer between a portion of a fuel container and a neck groove of a support assembly, in accordance with an embodiment.

As discussed above, the end support member may provide a neck groove for supporting the neck portion of a fuel container. In some embodiments, the neck portion of the fuel container may directly rest on such a neck groove. In other embodiments, an extra padding or layer may be provided between the neck portion of the fuel container and the neck groove. Such a padding or layer may be provided to better secure and/or protect the fuel container, reduce wear-and-tear of the end support member, provide a customized fit for the fuel container, and the like. FIG. 10 illustrates an exemplary implementation 1000 of such an extra layer between a portion of a fuel container and a neck groove of a support assembly, in accordance with another example. In this example, a collar 1002 may be (detachably or non-detachably) coupled to the neck portion of a fuel container (not shown) before the neck portion is placed on the neck groove 1004 of an end support member. Such a collar 1002 may be used to absorb and/or reduce damage to the fuel container, to better secure the neck portion (e.g., to prevent slipping), to provide adapting between the neck portions of different sizes and a universal neck groove, and the like. When worn, such a collar, rather than the end support member, may be replaced thereby increasing the durability of the end support member.

Various methods may be used to couple such a collar 1002 to the neck portion of a fuel container. For example, in an embodiment, interfacing surfaces of the collar and the neck portion of the fuel container include threaded grooves so that the collar may be screwed onto the neck portion. In an embodiment, the collar may include longitudinal slit and the collar may be resiliently spreadable at the slit to enclose a portion of a neck portion of a fuel container. As another example, two half-spherical collars may be clamped around the neck portion, for example, via bolting.

In some embodiments, the collar 1002 may act as an adapter between the neck portion of a fuel container and a neck groove. For example, in an embodiment, such collars may be used to adapt neck portions of different dimensions (e.g., diameters) to a universal neck groove. In various embodiments, the dimensions (e.g., inner diameter, outer diameter) of the collar may vary according to dimensions of the neck grooves, the dimensions of the neck portion of fuel containers, the environment and the like. In various embodiments, the material(s) used to construct such collars may be determined by cost, strength-to-weight ratio, impact requirement, the material for the neck portion of the fuel container and/or neck groove, the environment and the like. For example, the collars may be made from elastic, shock-absorbing, and/or high-friction material(s).

Figure 11A:
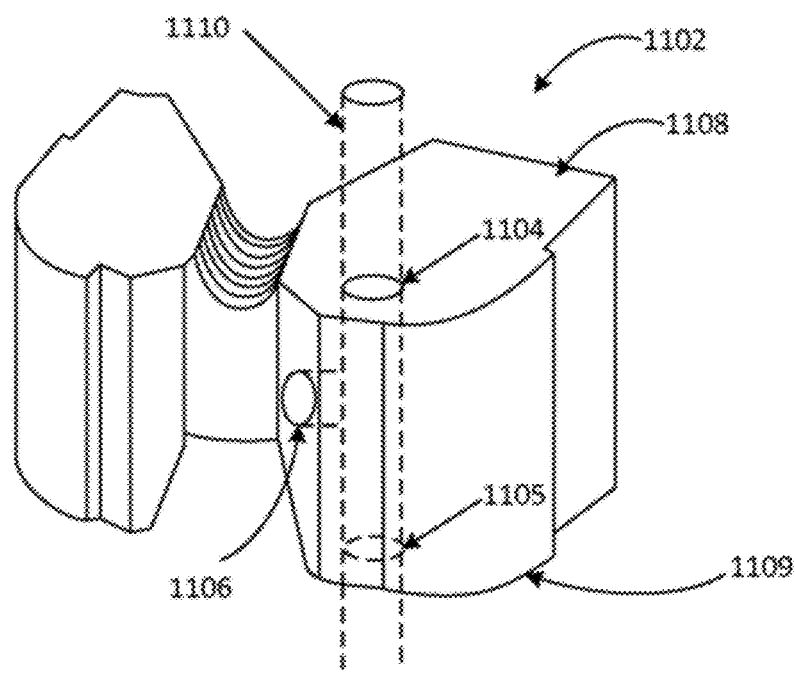
FIGS. 11a-b illustrate an exemplary mechanism for pressure release in a fuel storage system, in accordance with an embodiment.
Figure 11B:
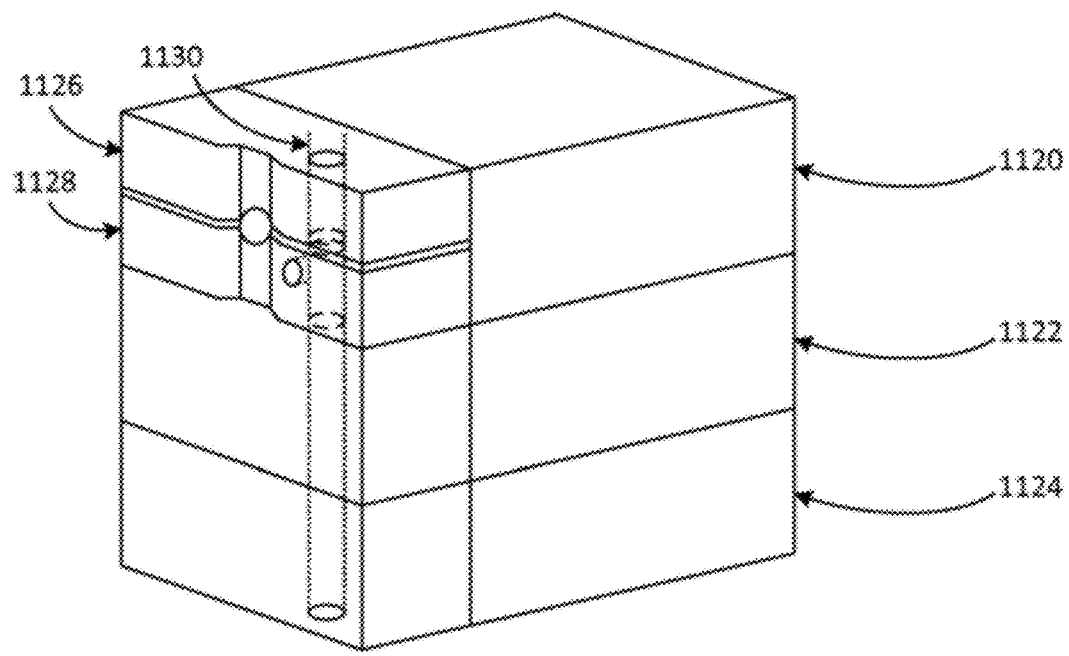

According to an aspect of the present invention, the fuel storage system described herein provides mechanisms for releasing pressure buildup in the fuel containers supported therein. In warm weathers, gaseous pressure may build up in a fuel container. Such pressure buildup may be undesirable and/or dangerous unless the excess pressure is timely released. FIGS. 11*a*-*b* illustrate an exemplary mechanism for pressure release in a fuel storage system, in accordance with an embodiment. As illustrated in FIG. 11*a*, an end support member 1102 may include a main through-hole 1104 (similar to the opening 714 of FIG. 7) on an inner surface 1108 of the end support member 1102. Such a through-hole 1104 may be substantially aligned with a similar through-hole 1105 on the opposing outer surface 1109 of the end support member 1108 as well as other similar through-holes on the surfaces of other end support member(s) configured be stacked or placed adjacent to the end support member 1108 to form a main channel 1110 in which excess pressure may be released.

In an embodiment, the end support member 1102 may include a side through-hole 1106 (similar to the opening 716 of FIG. 7) that may open into the main channel 1110 described above. In an embodiment, excess pressure in a fuel container supported by the end support member 1102 may be released through the side through-hole 1106 into the main channel 1108. The side through-hole 1106 may be connected to a pressure release valve coupled to the fuel container. Such a pressure release valve may be located near the neck portion of the fuel container. In an embodiment, excess pressure may be carried by pipes located within the hollow channels connecting the through-holes described above. Such pipes may be made from materials such as polymer, aluminum or the like. In another embodiment, at least some portions of such hollow channels may not house any such pipes.

As discussed above, the through-holes of end support members for multiple support assemblies may line up approximately to support effective release of excess pressure across multiple fuel containers. FIG. 11*b* illustrates an exemplary fuel storage system with pressure release, in accordance with at least an embodiment. In this example, multiple support assemblies 1120, 1122 and 1124 are stacked on top of each other. Each support assembly has a pair of end support members such as end support members 1126 and 1128. The pair of end support members may have through-holes that line up to form the main channel 1130 such as similar to the main channel 1110 discussed in connection with FIG. 11*a*. In addition, one or both of the end support members have a side through-hole for releasing pressure of an individual fuel container into the main channel 1130. When multiple such support assemblies are stacked such as illustrated, excess pressure from the fuel containers supported by these support assemblies may be released via the individual side through-holes into the common channel 1130. In various embodiments, components forming the main channel may or may not be fluid-tight. For example, in an embodiment, fuel may escape or vent through the components, such as a gap between the end support member 1126 and 1128.

Figure 12:
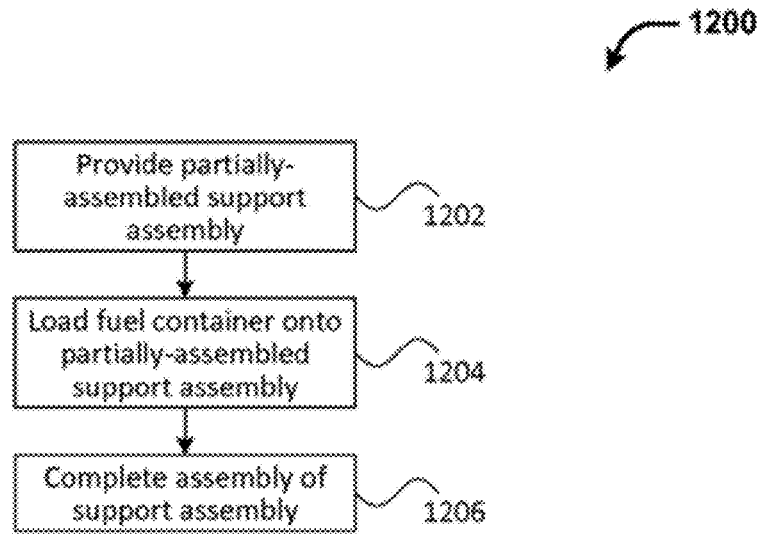
FIG. 12 illustrates a process for assembling a fuel container support assembly to support a fuel container, in accordance with an embodiment.

As discussed above, techniques described herein may provide a modular and simplified approach to supporting and/or transporting fuel containers. FIG. 12 illustrates a process or method 1200 for assembling a fuel container support assembly to support a fuel container, in accordance with an embodiment. In an embodiment, the process 1200 includes providing 1202 a partially assembled support assembly such as illustrated by the support assembly 501 of FIG. 5. In an embodiment, providing the partially assembled support assembly includes connecting two opposite facing end support members with at least two side frames, for example, to form a substantially rectangular prism shape. Multiple support assemblies thus shaped can be easily stacked or otherwise arranged in a spatially efficient manner. In other embodiments, the support assembly may have other shapes. In some embodiments, providing the partially assembled support assembly includes connecting at least one of the end support members with at least one of the side support members. In some cases, at least one of the end support members and/or side support member (or a component thereof) are not assembled to allow the fuel container to be loaded into the support assembly. For example, one of the end support members forming a neck enclosure for a neck portion of the fuel container may not be attached. In some embodiments, a side support member or a component thereof (e.g., a side frame) may not be attached to allow the loading of the fuel container.

In an embodiment, the process 1200 includes loading 1204 a fuel container into the partially-assembled support assembly described above. In some embodiments, a portion such as the neck portion of the fuel container may interface with one of the end support member. For example, the neck portion may rest upon a neck groove provided by the end support member, such as discussed in connection with FIG. 5. In some embodiments, a collar or a similar member may be coupled or attached to the neck portion before the neck portion interfaces with the end support member to provide additional support and/or adaptation, such as discussed in connection with FIG. 10.

In an embodiment, process 1200 includes complete 1206 assembly of the support assembly. Completing the assembly of the support assembly may include attaching at least one end support member and/or side frame to the partially-assembled support assembly. For example, to complete the assembly, one or more end support members that complete the neck enclosure of the fuel container may be coupled to the already-assembled end support member(s) forming the neck enclosure. Additionally, the end support member(s) may be coupled to existing side support members or components thereof (e.g., side frames) to complete the assembly.

In some embodiments, additional and/or different steps may be provided to assemble and load the support assembly. For example, in an embodiment, one or more side frames may be attached after the complete assembly of the end frames. For example, the end support members may be clasped around the neck portion of a fuel container first. Then, the side support members may be attached to the end support members to protect the body portion of the fuel container. Lastly, another set of end support members may be attached to the side support members to complete the assembly of the support assembly. In an embodiment, a partially-assembled support assembly comprises some or all of the side support members already attached to a first end frame. The first end frame may be for the bottom portion or the top portion of the fuel container. The fuel container is then loaded into the partially-assembled support assembly before a second end frame is assembled. Assembling the second end frame may include assembling components of the end frame as well as attaching the second end frame to the existing side support members.

In addition, multiple support assemblies may be coupled, stacked or otherwise arranged according to various configurations, such as those discussed in connection with FIG. 2, before or after one or more fuel containers are loaded into the support assemblies. In an embodiment, each of the multiple support assemblies is fully assembled and/or loaded before the support assemblies are coupled or arranged according to a configuration. For example adjacent support assemblies may be fastened using any suitable means such as bolts, wires, wedges and the like. For another example, support assemblies may be placed adjacent to each other without being coupled. In another embodiment, some or all of support assemblies may be partially assembled when they are configured with other support assemblies. For example, in an embodiment, one or more support assemblies may only include some of the end support members and/or side supports necessary to complete the assembly. In some cases, the partially assembled support assemblies may include loaded fuel containers. The partially assembled support assemblies may be configured with other partially assembled and/or fully assembled support assemblies. Subsequent to or during such configuration, the partially assembled support assemblies may be fully assembled such as by adding an end frame and/or a side frame, loading a fuel container and the like.

In some embodiments, pipes may be installed through the openings provided by the fuel container support assemblies such as described in connection with FIGS. 11*a-b*. Such pipes may be configured to facilitate the release of excess pressure from the fuel containers, fueling, or other purposes. The installation of the pipes may occur before, during, or after the loading of the fuel containers. The installation of the pipes can also occur before, during or after the configuration of the support assemblies of the fuel storage system.

In various embodiments, a reverse process of the process 1200 may be followed to allow disassemble and/or unloading of the fuel container from the support assembly. For example, to unload a fuel container, at least an end support member and/or side support member may be removed from the support assembly. In some instances, one or more end support members may be detached from other end support members and/or side support members. For example, an end support member supporting the neck portion of the fuel container may be removed to allow the fuel container to be unloaded from the support assembly. Alternatively or additionally, an entire end frame and/or a side support member can be removed to unload the fuel container. The components to be disassembled from the support assembly and the order of such disassembly may vary based on considerations such as specific structure of the support assembly, cost, convenience, space, weight and dimensions of the fuel container, configuration of the fuel storage system, and/or the like.

In various embodiments, the number and/or arrangement of the support assemblies and/or members thereof may be based on the characteristics of the environment where the fuel storage system is used such as the type and dimension of the cab of a vehicle. In an embodiment, such environment information is obtained and analyzed, for example, via a computerized modeling tool to determine a configuration (e.g., number, types and arrangement) of the support assemblies. In some embodiments, such determination may be aimed at optimizing the cost, space and/or other configurable considerations. According to the determined configuration, the support assemblies may be selected, assembled and/or arranged (e.g., connected) such as discussed above.

As discussed above, the fuel storage system may be mounted, for example, to a vehicle according to various configurations such as discussed in connection with FIG. 1. Alternatively, the fuel storage system may be used in a stand-alone fashion. As described above, in an embodiment, the support assemblies may include a small number (e.g., four, six or eight) of modular members with a small number (e.g., two, three or four) of distinct shapes that are easy to manufacture, assemble, dissemble and/or reuse. In some embodiments, the modular members are also designed to be durable and lightweight.

Figure 13A:
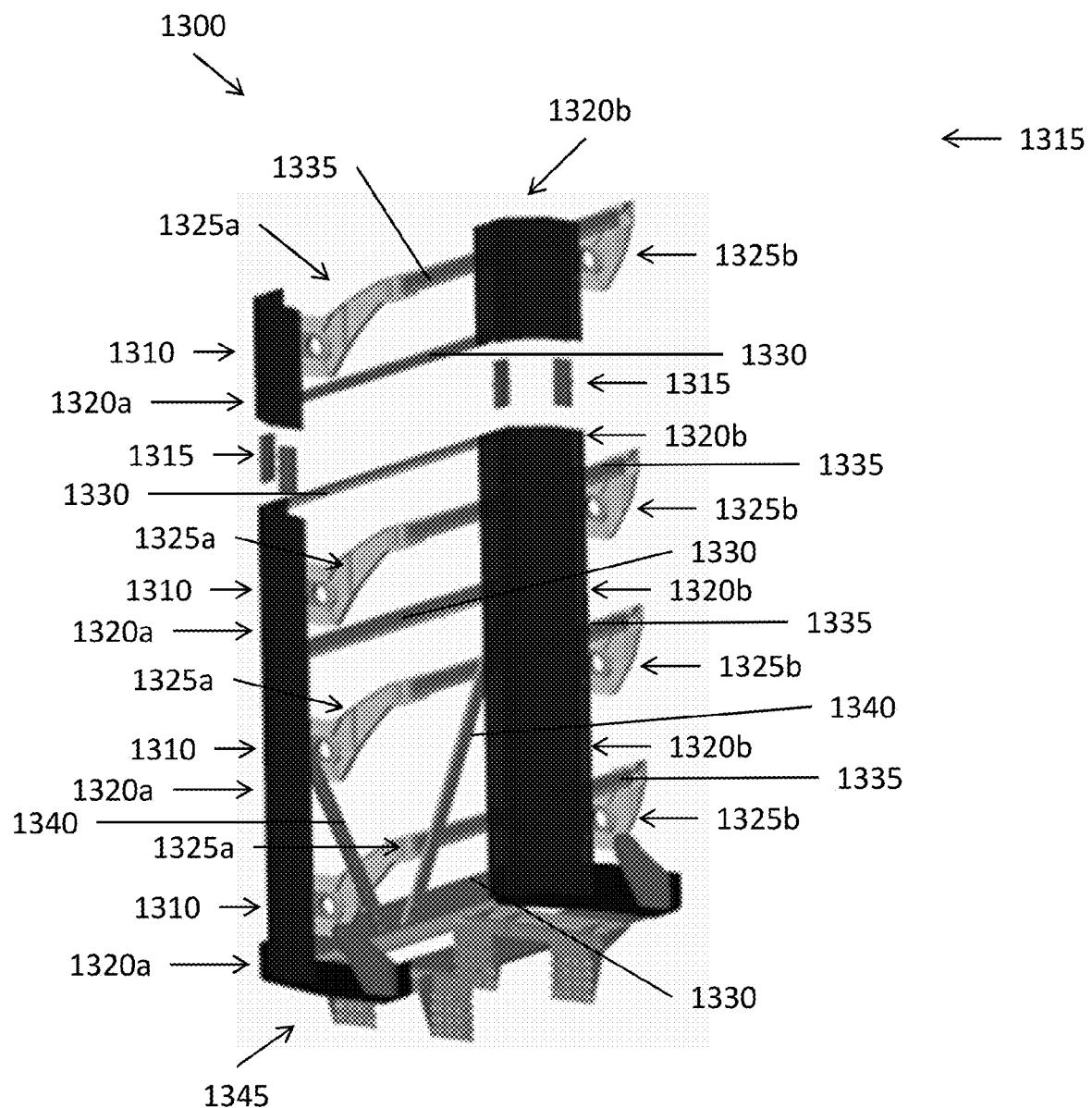
FIGS. 13a-b illustrate an exemplary fuel storage system, in accordance with embodiments.
Figure 13B:
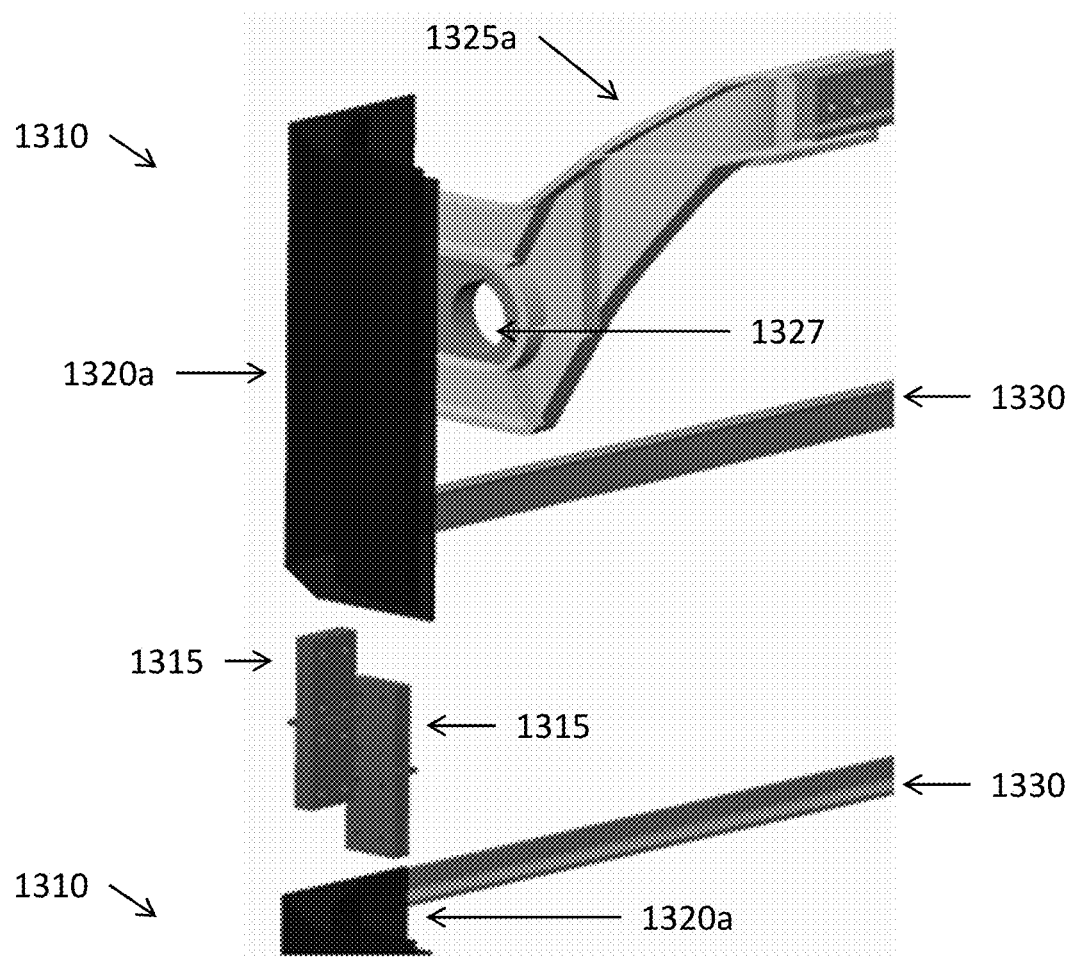

FIGS. 13a and 13b show an exemplary fuel storage system 1300. The fuel storage system 1300 may be configured to support one or more fuel containers or vessels with the same or different characteristics as discussed above and herein. The fuel storage system 1300 may comprise a plurality of support assemblies 1310 stacked together. The support assembly 1310 may enclose and support a single fuel container. Alternatively, the support assembly 1310 may enclose and support multiple fuel containers. The fuel storage system 1300 may be mounted in any number of locations on or near a vehicle such as on a side of the vehicle, on a roof of the vehicle, on a trailer or detachable portion of the vehicle, on a tailgate or tailboard of the vehicle, on a hood or bonnet of the vehicle, on a door of the vehicle, on a back of a body of the vehicle, or on a front of a body of the vehicle, to name a few examples.

A plurality of support assemblies 1310 may be stacked together in a modular fashion to form any number of configurations. As shown in FIG. 13a, four of the support assemblies 1310 are stacked together vertically. Different numbers of support assemblies 1310, such as two, three, or five or more, may be stacked together as well. Alternatively or in combination with stacking the support assemblies 1310 vertically, the support assemblies 1310 may be stacked horizontally. In some embodiments, one or more of support assemblies 1310 located on the bottom of the fuel storage system 1300 may support the weight(s) of the one or more support assemblies 1310 above. The support assembly 1310 may encompass and/or bear the weight of a corresponding fuel container. The configurations of the support assemblies 1310 may be arbitrarily selected such as to be customized to fit a particular storage space (e.g., on a vehicle, in a warehouse). The support assemblies 1310 may be detachably coupled to each other or separately located.

The support assemblies 1310 may be coupled to one another in many ways. As shown in FIG. 13a, for example, each support assembly 1310 may comprise a plurality of slots through which inserts or pegs 1315 can be inserted to couple vertically adjacent support assemblies 1310. The inserts or pegs 1315 can have many shapes or configurations. For example, the insert or pegs 1315 may be elongate and have a triangular, square, ovoid, or circular cross-sectional shape. The inserts or pegs 1315 can restrict unwanted lateral movement between adjacent support assemblies 1310. To further secure the inserts or pegs 1315, an adhesive may be provided within the slots or the inserts or pegs 1315 may be secured with the aid of a fastener built into or removeable from the support assembly 1310. Each support assembly 1310 may comprise a first end support member 1320a and a second end support member 1320b. The plurality of slots for the pegs 1315 may be present on one or more of the side support members 1320a, 1320b, typically both. As shown in FIG. 13a, the slots may be vertically oriented so that the support assemblies 1310 may be vertically stacked. Alternatively or in combination, the slots may be horizontally oriented so that the support assemblies 1310 may be horizontally stacked. While inserts or pegs 1315 are shown and described for coupling two or more support assemblies 1310 together, other means of fastening two or more support assemblies 1310 are also contemplated, including include nuts and bolts, nails, locks, latches, wires, joints, interlocks, soldering, welding, gluing and the like. In other embodiments, the support assemblies 1310 may simply be placed or stacked adjacent to one another without any fastening mechanism.

The support assembly 1310 may comprise a first side support member 1325a extending horizontally and forwardly from the first end support member 1320a and a second side support member 1325b extending horizontally and forwardly from the second end support member 1320b. One or more fuel containers may be supported length-wise between the first side support member 1325a and the second side support member 1325b. The first side support member 1325a may comprise an aperture 1327 through which a neck portion of the fuel container may pass through to be supported. The first side support member 1325a may bear the weight of the fuel container at the aperture 1327 or simply contact the fuel container. In some embodiments, a collar or a similar member may be coupled or attached to the neck portion before the neck portion interfaces with the aperture 1327 to provide additional support and/or adaptation. The second side support member 1325b on the opposite end of the fuel container may comprise a fastener to removably couple to a base portion of the fuel container. The second side support member 1325b may bear the weight of the fuel container at its base portion or simply contact the fuel container. The first and second side support members 1325a, 1325b may be customized according to the shape, configuration, and/or dimensions of the fuel container(s) selected to be supported. For example, the size and location of the aperture 1327 may be selected to conform to the size and location of the neck portion of the selected fuel container.

The support assembly 1310 may further comprise one or more supporting crossbars 1330 oriented horizontally and coupling the first end support member 1320a and the second end support member 1320b together. As shown in FIG. 13a, the supporting crossbars 1330 are rectangular in shape but they may be rounded as well. Also as shown in FIG. 13a, a single supporting crossbar 1330 may be provided for a single set of first and second side support members 1325a, 1325b but other numbers of supporting crossbars 1330 may be provided as well. In some embodiments, the fuel storage system 1300 may comprise one or more truss members 1340 to couple the two or more supporting crossbars 1330 of the different support assemblies 1310 together. The truss members 1340 may be permanently attached (e.g., welded or soldered) or detachably attached to the crossbars 1330. More or fewer truss members 1340 may be provided for different parts of the fuel storage system 1300 to provide more durability or impact resistance to different parts of the fuel storage system 1300, such as for a bottom of the fuel storage system 1300.

The support assembly 1310 may further comprise a removable crossbar 1335 also oriented horizontally and coupling the first side support member 1320a and the second side support member 1320b together. As shown in FIG. 13a, the removable crossbars 1335 are rectangular in shape but they may be rounded as well. Also as shown in FIG. 13a, a single removable crossbar 1335 may be provided for a single set of first and second side support members 1325a, 1325b but other numbers of removable crossbars 1335 may be provided as well. The fuel container(s) may be supported width-wise between the supporting crossbar 1330 and the removable crossbar 1335. The supporting crossbar 1330 and the removable crossbar 1335 may shield and protect a body portion of the fuel container. The dimensions (e.g., length) of the supporting crossbar 1330 and the removable crossbar 1335 may be based at least in part on the dimensions (e.g., length) of the fuel container desired to be stored. When the fuel container is supported within the support assembly 1310, the removable crossbar 1335 may be selectively removed so that the fuel container can be accessed and removed from the support assembly 1310. The fuel container may be pulled laterally away from the support assembly 1310 through the opening created by removing the removable crossbar 1330.

When multiple fuel containers are supported within the support assemblies 1310 of the fuel storage system 1300, one or more of the fuel containers may be accessed and removed by temporarily removing one or more of the removable crossbars 1335. In this manner, one or more of the fuel containers may be removed from the fuel storage system 1300 without unstacking the individual support assemblies 1310. For example, as shown in FIG. 13a where four support assemblies 1310 are stacked, a fuel container in the bottom or middle two support assemblies 1310 may be removed without needing to unstack the support assemblies 1310 to access the bottom or middle two fuel containers.

The fuel storage system 1300 may further comprise a base 1345 to which the bottom most support assembly 1310 may be coupled. The base 1345 may couple to a vehicle 104 as described above to attach the fuel storage system 1300 to the vehicle. As discussed above and herein, the fuel storage system 1300 may be mounted or attached to any suitable portion(s) of a vehicle. The components or portions of the fuel storage system 1300 may be constructed using any suitable material or combination of materials as described above and herein. In some cases, the support assemblies 1310 in different parts of the 1300 may be constructed with more durable and/or heavier materials than in other parts.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A fuel container support assembly for supporting a fuel container, comprising:

a first end support member and a second end support member;

a first side support member coupled to the first end support member and a second side support member coupled to the second end support member;

a supporting crossbar and a removable crossbar each coupling the first and second end support members together, wherein the removable crossbar is removably coupled to one or more of the first or second end support members and removably attachable to the first and second side support members to couple the first and second end support members to one another, wherein the first and second end support members are arranged to enclose a length of the fuel container therebetween, and the first and second side support members are configured to support the fuel container when placed lengthwise therebetween, wherein the supporting crossbar and the removable crossbar are arranged to enclose a width of the fuel container therebetween, and wherein the first side support member comprises an aperture such that when the fuel container is placed within the fuel container support assembly, a neck portion of the fuel container is supported within the aperture.

2. The fuel container support assembly of claim 1, wherein at least one of the first or second end support members is detachably coupled to both the supporting cross bar and the removable crossbar.

3. The fuel container support assembly of claim 1, wherein the first end support member and the second side support member are interchangeable.

4. The fuel container support assembly of claim 1, wherein the second side support member is coupled to a bottom portion of the fuel container when the fuel container is placed within the fuel container support assembly.

5. A fuel storage system, comprising:

a plurality of the fuel container support assemblies of claim 1, wherein the fuel container support assemblies are stacked together.

6. The fuel storage system of claim 5, wherein the fuel container support assemblies are stacked vertically.

7. The fuel storage system of claim 5, wherein the fuel container support assemblies comprise a first fuel container support assembly and a second fuel container support assembly adjacent to the first fuel container support assembly, wherein the first and second end support members of the first fuel container support assembly are removably coupled to the first and second end support members of the second fuel container support assembly to stack the first and second fuel container support assemblies together.

8. The fuel storage system of claim 7, wherein the first and second end support members of the first fuel container support assembly are removably coupled to the first and second end support members of the second fuel container support assembly with a plurality of pegs traversing the first and second end support members of the first and second fuel container support assemblies.

9. The fuel storage system of claim 5, further comprising one or more truss members coupling and supporting the crossbars of the fuel container support assemblies that are adjacent to one another.

10. The fuel storage system of claim 5, further comprising a base member coupled to the plurality of the fuel container support assemblies.

11. A fuel storage system, comprising:
a plurality of fuel container support assemblies stacked together, wherein each of the plurality of fuel container support assemblies is configured to support a fuel container and comprises:
a first end support member;
a second end support member;
a supporting crossbar coupling the first and second end support members together; and
a removable crossbar coupling the first and second end support members together, the removable crossbar being removably coupled to one or more of the first or second end support members,
wherein the first and second end support members are arranged to enclose a length of the fuel container therebetween,
wherein the supporting crossbar and the removable crossbar are arranged to enclose a width of the fuel container therebetween,
wherein a fuel container in a middle or bottom fuel container support assembly of the stacked fuel container support assemblies is removable from the fuel storage system without unstacking the fuel support assemblies.

12. The fuel storage system of claim 11, wherein the fuel container support assemblies are stacked vertically.

13. The fuel storage system of claim 11, wherein the plurality of the fuel container support assemblies comprises a first fuel container support assembly and a second fuel container support assembly adjacent to the first fuel container support assembly, wherein the first and second end support members of the first fuel container support assembly are removably coupled to the first and second end support members of the second fuel container support assembly to stack the first and second fuel container support assemblies together.

14. The fuel storage system of claim 13, wherein the first and second end support members of the first fuel container support assembly are removably coupled to the first and second end support members of the second fuel container support assembly with a plurality of pegs traversing the first and second end support members of the first and second fuel container support assemblies.

15. The fuel storage system of claim 11, further comprising one or more truss members coupling and supporting the crossbars of the fuel container support assemblies that are adjacent to one another.

16. The fuel storage system of claim 11, further comprising a base member coupled to the plurality of the fuel container support assemblies.

* * * * *

UNITED STATES PATENT AND TRADEMARK OFFICE
CERTIFICATE OF CORRECTION

PATENT NO. : 10,195,937 B2
APPLICATION NO. : 15/230311
DATED : February 5, 2019
INVENTOR(S) : Todd F. Sloan et al.

Page 1 of 1

It is certified that error appears in the above-identified patent and that said Letters Patent is hereby corrected as shown below:

In the Specification

In Column 2, Line 10, change "the" to --The--.

In Column 10, Line 32, change "interface" to --interface.--.

In Column 14, Line 13, change "722" to --724--.

In the Claims

In Column 22, Lines 29-30, Claim 2, change "cross bar" to --crossbar--.

Signed and Sealed this
Twenty-sixth Day of November, 2019

Andrei Iancu
*Director of the United States Patent and Trademark Office*